(12) United States Patent
Olgren et al.

(10) Patent No.: US 7,914,043 B2
(45) Date of Patent: Mar. 29, 2011

(54) ADJUSTABLE STEERING COLUMN ASSEMBLY FOR A VEHICLE

(75) Inventors: Leland N. Olgren, Frankenmuth, MI (US); Jeff A. Gregg, Owosso, MI (US)

(73) Assignee: Nexteer (Beijing) Technology Co., Ltd.

( * ) Notice: Subject to any disclaimer, the term of this patent is extended or adjusted under 35 U.S.C. 154(b) by 353 days.

(21) Appl. No.: 12/098,817

(22) Filed: Apr. 7, 2008

(65) Prior Publication Data

US 2009/0250916 A1   Oct. 8, 2009

(51) Int. Cl.
*B62D 1/187* (2006.01)
*B62D 1/184* (2006.01)
*B62D 1/185* (2006.01)

(52) U.S. Cl. ............................ 280/775; 280/779; 74/493
(58) Field of Classification Search .................. 280/775, 280/779; 74/493, 492, 495; 403/109.1, 110; B62D 1/184, 1/185, 1/187, 1/189
See application file for complete search history.

(56) References Cited

U.S. PATENT DOCUMENTS

| | | | |
|---|---|---|---|
| 2,770,981 A | 11/1956 | Fieber | |
| 3,335,619 A | 8/1967 | Curran | |
| 3,373,965 A | 3/1968 | Bien | |
| 3,791,223 A | 2/1974 | Treichel et al. | |
| 3,955,439 A | 5/1976 | Meyer | |
| 4,046,024 A | 9/1977 | Broucksou | |
| 4,594,909 A | 6/1986 | Yamaguchi | |
| 4,793,204 A | 12/1988 | Kubasiak | |
| 5,213,004 A | 5/1993 | Hoblingre | |
| 5,361,646 A | 11/1994 | Venable | |
| 5,363,716 A | 11/1994 | Budzik, Jr. et al. | |
| 5,452,624 A | 9/1995 | Thomas et al. | |
| 5,713,245 A | 2/1998 | Bobbitt, III et al. | |
| 6,467,807 B2 | 10/2002 | Ikeda et al. | |
| 6,543,807 B2 | 4/2003 | Fijiu et al. | |
| 6,695,349 B2 | 2/2004 | Bohlen et al. | |
| 6,957,595 B2 | 10/2005 | Kromer et al. | |
| 7,021,660 B2 | 4/2006 | D'Agostino et al. | |
| 2005/0225068 A1 | 10/2005 | Ishida et al. | |
| 2006/0207378 A1* | 9/2006 | Kramer et al. | 74/492 |
| 2006/0219043 A1 | 10/2006 | Fujiu et al. | |
| 2009/0205459 A1* | 8/2009 | Olgren | 74/493 |

FOREIGN PATENT DOCUMENTS

JP   2004-136870 A * 5/2004

* cited by examiner

*Primary Examiner* — Eric Culbreth
*Assistant Examiner* — Keith Frisby
(74) *Attorney, Agent, or Firm* — Cantor Colburn LLP

(57) ABSTRACT

The present invention provides for a steering column assembly having a column jacket defining a longitudinal axis. A first clamping member and a second clamping member are disposed along the longitudinal axis about the column jacket. A lever is coupled to one of the first and second clamping members and rotatable between a set and adjustable positions. The lever includes a first arm and a second arm flanking the column jacket and coupled to at least one of the first and second clamping members with a portion of the locking device disposed about at least one of the first and second clamping members and engaging both of the first and second arms such that rotation of the lever moves the portion of the locking device for minimizing rotation of the lever between the set and adjustable positions when the locking device moves between a locked and unlocked positions.

33 Claims, 18 Drawing Sheets

ADJUSTABLE STEERING COLUMN ASSEMBLY FOR A VEHICLE

BACKGROUND OF THE INVENTION

1. Field of the Invention

The present invention relates to an adjustable steering column assembly for a vehicle.

2. Description of the Prior Art

Vehicles may be equipped with a column jacket for adjusting a position of a steering wheel to enhance the comfort and safety of a user. For example, the column jacket may move in a telescoping direction for moving the steering wheel closer to and away from the user. Also, the column jacket may move in a tilting direction for moving the steering wheel up and down relative to the user. These features cooperate to enable the user to adjust the steering wheel to a desired, convenient position for operating the vehicle and for moving the steering wheel out of the way to provide greater access to getting into and out of the driver's seat of the vehicle.

A first clamping member and a second clamping member are disposed about the column jacket for selectively allowing and preventing movement of the column jacket. A bolt is coupled to the first and second clamping members with a lever coupled to the bolt and moveable between a set position for preventing movement of the column jacket and an adjustable position for allowing movement of the column jacket. A locking device is coupled to the bolt and is moveable between a locked position and an unlocked position during rotation of the lever between the set and adjustable positions, respectively. However, the lever rotation between the set and adjustable positions is large when moving the locking device between the locked and unlocked positions.

Therefore, there remains a need to develop an adjustable steering column assembly that minimizing rotation of a lever between a set position and an adjustable position when moving a locking device between a locked position and an unlocked position, respectively.

SUMMARY OF THE INVENTION AND ADVANTAGES

The present invention provides for a steering column assembly having a column jacket defining a longitudinal axis and moveable in at least one of a telescoping direction and a tilting direction. A first clamping member is disposed along the longitudinal axis about the column jacket and a second clamping member is disposed along the longitudinal axis adjacent the first clamping member about the column jacket. A lever is coupled to at least one of the first and second clamping members and rotatable between a set position for preventing movement of the column jacket in at least one of the telescoping direction and the tilting direction and an adjustable position for allowing movement of the column jacket in at least one of the telescoping direction and the tilting direction. A locking device is coupled to the lever and at least one of the first and second clamping members and moveable between a locked position and an unlocked position during rotation of the lever between the set and adjustable positions, respectively. The lever includes a first arm and a second arm flanking the column jacket and coupled to at least one of the first and second clamping members with a portion of the locking device disposed about at least one of the first and second clamping members and engaging both of the first and second arms and at least one of the first and second clamping members such that rotation of the lever moves the portion of the locking device for minimizing rotation of the lever between the set and adjustable positions when the locking device moves between the locked and unlocked positions.

The assembly further includes a lever locking mechanism for an adjustable steering column having a column jacket defining a longitudinal axis with the column jacket moveable in at least one of a telescoping direction and a tilting direction. The mechanism includes a first clamping member adapted to be disposed along the longitudinal axis about the column jacket and a second clamping member disposed adjacent the first clamping member and adapted to be disposed along the longitudinal axis about the column jacket. A lever is coupled to at least one of the first and second clamping members with the lever rotatable between a set position for preventing movement of the column jacket in at least one of the telescoping and tilting directions and an adjustable position for allowing movement of the column jacket in at least one of the telescoping and tilting directions. A locking device includes at least one first locking member mounted to the lever and at least one second locking member disposed adjacent the first locking member and mounted to the lever with the locking members moveable between a locked position and an unlocked position during rotation of the lever between the set and adjustable positions, respectively. The lever includes a first arm and a second arm each defining a first axis extending substantially parallel to each other with the first locking member at least partially disposed along the first axis when the lever in the set position. Each of the first and second arms also define a second axis extending substantially parallel to each other with the second axis disposed at an angle relative to the first axis with the second locking member at least partially disposed along the second axis when the lever in the set position. Rotation of the lever to the adjustment position moves the first locking member away from the first axis and the second locking member away from the second axis for minimizing rotation of the lever when the locking device moves between the locked and unlocked positions.

The assembly also includes a clamping apparatus for an adjustable steering column having a column jacket defining a longitudinal axis with the column jacket moveable in at least one of a telescoping direction and a tilting direction. The apparatus includes a first clamping member adapted to be disposed along the longitudinal axis about the column jacket. A second clamping member is disposed adjacent the first clamping member and adapted to be disposed along the longitudinal axis about the column jacket. A locking device is coupled to at least one of the first and second clamping members and moveable between a locked position for preventing movement of the column jacket in at least one of the telescoping direction and the tilting direction and an unlocked position for allowing movement of the column jacket in at least one of the telescoping direction and the tilting direction. The first clamping member includes a first upper portion and a first lower portion spaced from the first upper portion. The first clamping member is coupled to the second clamping member and rotatable relative to the second clamping member when the locking device moves between the locked and unlocked positions for selectively allowing and preventing movement of the column jacket in at least one of the telescoping and tilting directions.

The present invention therefore provides for an adjustable steering column assembly that minimizing rotation of a lever between a set position and an adjustable position when moving a locking device between a locked position and an unlocked position, respectively. Preferably, the lever rotates 10 degrees (10°) or less between the set and adjustable positions when moving the locking device between the locked and unlocked positions. The assembly also reduced tolerance requirements and eliminates and/or simplifies components to reduce the complexity of the design thus reducing manufacturing costs.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
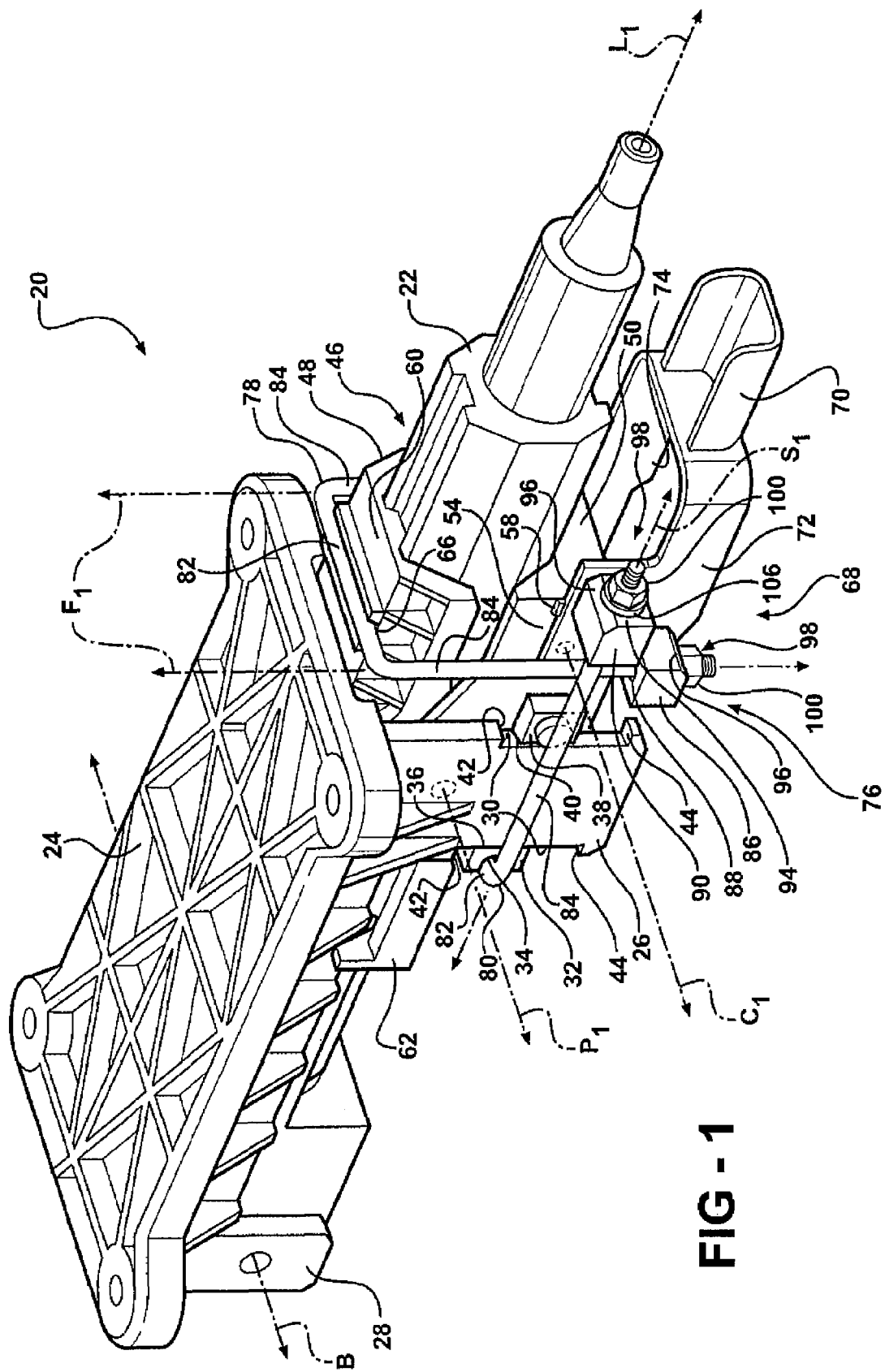
FIG. 1 is a perspective view of an adjustable steering column assembly having a column jacket defining a longitudinal axis with the column jacket moveable in a telescoping direction along the longitudinal axis and a tilting direction transverse to the longitudinal axis of a first embodiment.
Figure 2:
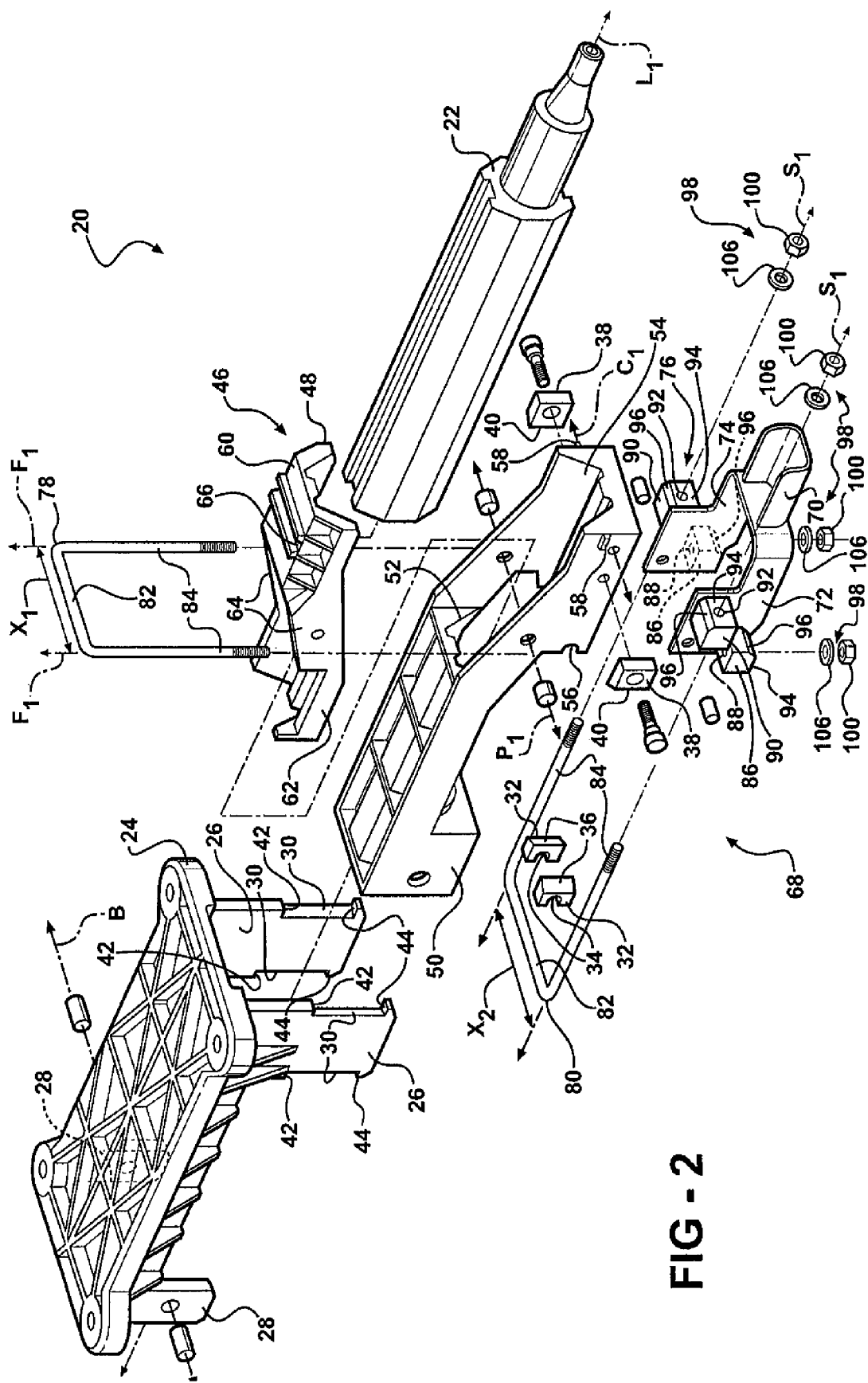
FIG. 2 is an exploded perspective view of the adjustable steering column assembly of the first embodiment.
Figure 5:
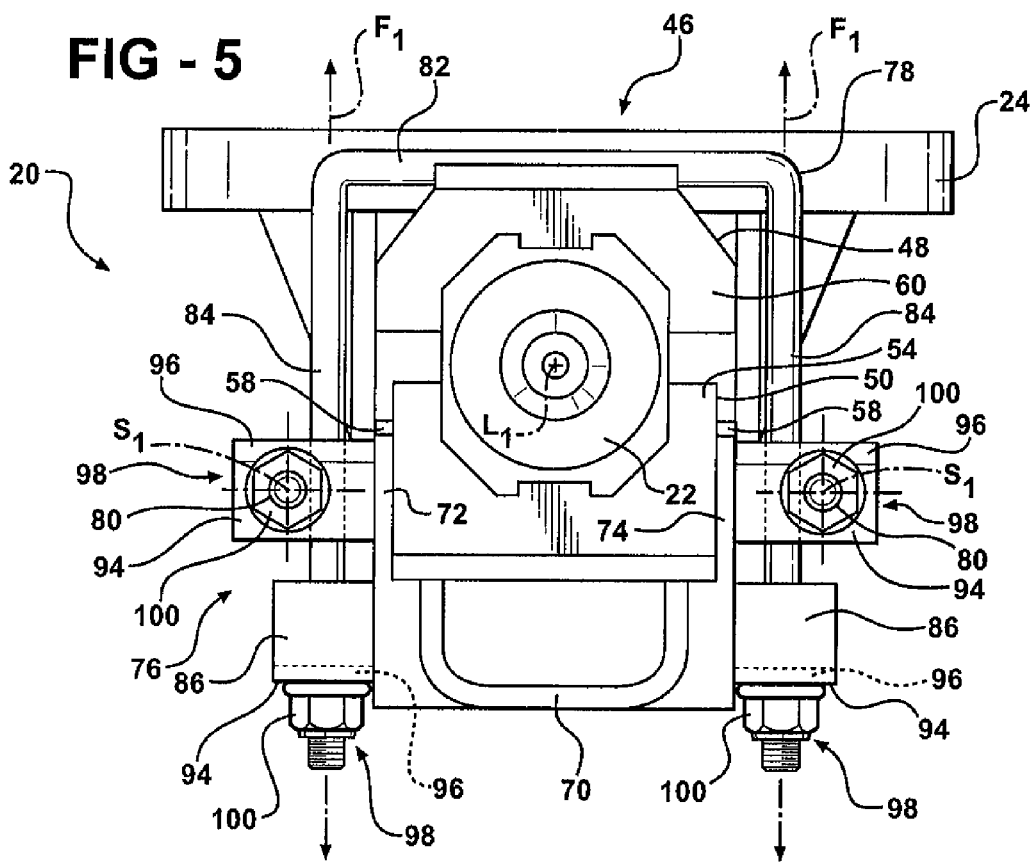
FIG. 5 is an end view of the steering column assembly having a first arm and a second arm each defining a first axis and a second axis with the first axis disposed closer to the longitudinal axis than the second axis.

Referring to the Figures, wherein like reference numerals indicate like or corresponding parts throughout the several views, an adjustable steering column assembly 20 for a vehicle (not shown) is generally shown in FIGS. 1, 2 and 5.

Referring to FIGS. 1 and 2, the adjustable steering column assembly 20 includes a column jacket 22 defining a longitudinal axis $L_1$ with the column jacket 22 moveable in at least one of a telescoping direction and a tilting direction. A steering wheel (not shown) is coupled to the column jacket 22 for allowing a user to adjust the column jacket 22 in the telescoping and tilting directions. The column jacket 22 moves substantially parallel the longitudinal axis $L_1$ for the telescoping direction and substantially transverse the longitudinal axis $L_1$ for the tilting direction. In other words, the steering wheel moves closer to and away from the user when adjusting the telescoping direction and the steering wheel moves up and down relative to the user when adjusting the tilting direction. Preferably, the column jacket 22 moves in both the telescoping and tilting directions. However, it is to be appreciated that the column jacket 22 may move only in the telescoping direction or only in the tilting direction.

The assembly 20 further includes a bracket 24 mounted to the vehicle and supporting the column jacket 22. The bracket 24 includes a plurality of first legs 26 disposed substantially parallel to each other and transverse the longitudinal axis $L_1$. The bracket 24 further includes a plurality of second legs 28 disposed substantially parallel to each other and transverse to the longitudinal axis $L_1$ with the second legs 28 spaced from the first legs 26. Each of the first legs 26 define a plurality of sloped surfaces 30 spaced from each other with a pair of the sloped surfaces 30 facing the second legs 28 and an other pair of the sloped surfaces 30 facing away from the second legs 28. The bracket 24 defines a bracket axis B spaced from the first legs 26 and extending substantially transverse the longitudinal axis $L_1$ through the second legs 28 for allowing the column jacket 22 to move in the tilting direction.

A plurality of first wedges 32 are spaced from each other and each defines a recess 34 and a first angled surface 36 spaced from the recess 34. One of the first wedges 32 selectively engages one of the first legs 26 and an other one of the first wedges 32 selectively engages an other one of the first legs 26. More specifically, the first angled surfaces 36 of each of the first wedges 32 are configured to cooperate with the sloped surfaces 30 of the first legs 26 such that the first angled surface 36 of each of the first wedges 32 is moveable along the sloped surfaces 30 and selectively engages the sloped surfaces 30 for aiding in preventing and allowing movement of the column jacket 22 in the tilting direction and for aiding in preventing movement of the column jacket 22 perpendicular to the tilting direction. In other words, the first wedges 32 aid in prevent movement of the column jacket 22 side to side, more specifically, prevent movement of the steering wheel side to side relative to the user.

A plurality of second wedges 38 are spaced from each other and spaced from the first wedges 32 with the second wedges 38 disposed substantially parallel to the first wedges 32. Each of the second wedges 38 define a second angled surface 40 facing the first legs 26 with one of the second wedges 38 selectively engaging one of the first legs 26 and an other one of the second wedges 38 selectively engaging an other one of the first legs 26. More specifically, the second angled surface 40 of each of the second wedges 38 are configured to cooperate with the sloped surfaces 30 of each of the first legs 26 such that the second angled surface 40 of each of the second wedges 38 is moveable along the sloped surfaces 30 and selectively engages the sloped surfaces 30 for aiding in preventing and allowing movement of the column jacket 22 in the tilting direction and for aiding in preventing movement of the column jacket 22 perpendicular to the tilting direction. In other words, the second wedges 38 aid in prevent movement of the column jacket 22 side to side, more specifically, prevent movement of the steering wheel side to side relative to the user. Thus, the first and second wedges 32, 38 cooperate with each other along the first legs 26 of the bracket 24 for preventing movement of the column jacket 22 side to side.

Each of the first legs 26 of the bracket 24 further include a plurality of upper shoulders 42 spaced from each other for providing a maximum upward position the column jacket 22 may move upwardly relative to the user in the tilting direction. When the maximum upward position is desired, the first wedges 32 and the second wedges 38 abut respective upper shoulders 42 of the first legs 26. Each of the first legs 26 further include a plurality of lower shoulders 44 spaced from each other for providing a maximum downward position of the column jacket 22 may move downwardly relative to the user in the tilting direction. When the maximum downward position is desired, the first wedges 32 and the second wedges 38 abut respective lower shoulders 44 of the first legs 26.

Figure 3:
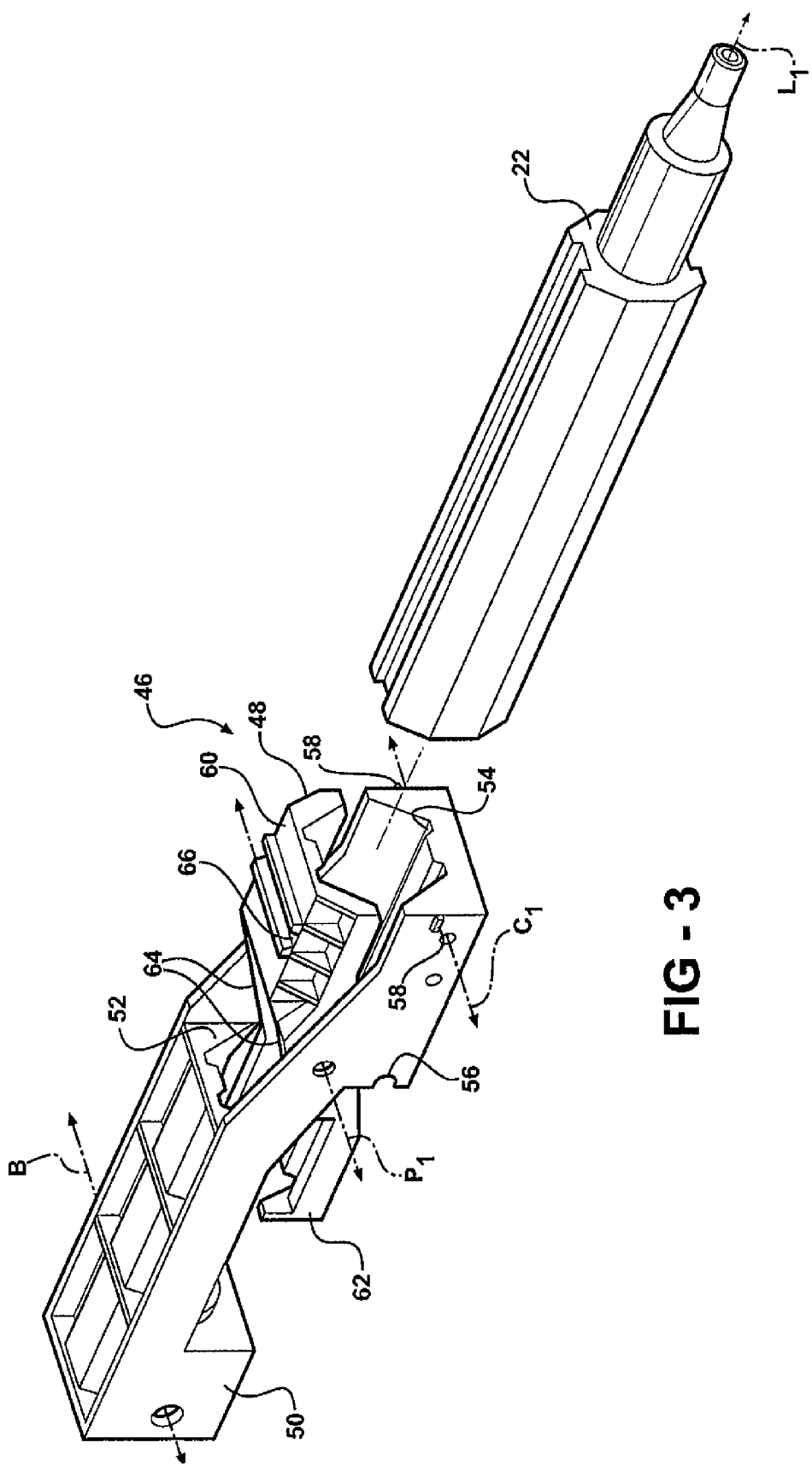
FIG. 3 is a partial exploded view of the column jacket and a first clamping member disposed within a second clamping member such that the first clamping member rotates relative to the second clamping member for clamping the column jacket therebetween.

Also referring to FIG. 3, the assembly 20 further includes a clamping apparatus, generally indicated at 46, for an adjustable steering column having the column jacket 22 defining the longitudinal axis $L_1$ with the column jacket 22 moveable in at least one of the telescoping direction and the tilting direction. The clamping apparatus 46 includes a first clamping member 48 adapted to be disposed along the longitudinal axis $L_1$ about the column jacket 22 and a second clamping member 50 disposed adjacent the first clamping member 48 and adapted to be disposed along the longitudinal axis $L_1$ about the column jacket 22. More specifically, the first clamping member 48 is disposed along the longitudinal axis $L_1$ about the column jacket 22 and the second clamping member 50 is disposed along the longitudinal axis $L_1$ adjacent the first clamping member 48 about the column jacket 22. The first clamping member 48 is rotatable relative to the second clamping member 50 for selectively allowing and preventing movement of the column jacket 22 in at least one of the telescoping direction and the tilting direction. The first clamping member 48 will be discussed further below. It is to be appreciated that the clamping apparatus 46 may include other components of the assembly 20.

The second clamping member 50 is coupled to the bracket 24 and moveable relative to the bracket 24 in the tilting direction. More specifically, the second clamping member 50 is mounted to the second legs 28 of the bracket 24 and rotatable about the bracket axis B for moving the column jacket 22 in the tilting direction. Having the second clamping member 50 rotatable about the bracket axis B for tilting the column jacket 22 is commonly known to those of ordinary skill in the art as raking.

The second clamping member 50 defines a pivot axis $P_1$ extending transverse to the longitudinal axis $L_1$. More specifically, the first clamping member 48 is coupled to the second clamping member 50 about the pivot axis $P_1$ for allowing the first clamping member 48 to rotate relative to the second clamping member 50 about the pivot axis $P_1$. The first clamping member 48 may be coupled to the second clamping member 50 by any suitable fasteners known to those of ordinary skill in the art which allows the first clamping member 48 to rotate relative to the second clamping member 50. The second wedges 38 are mounted to the second clamping member 50 and spaced from the pivot axis $P_1$. However it is to be appreciated that the second wedges 38 may be mounted anywhere along the second clamping member 50 as long as the second wedges 38 engage the first legs 26. Further, the second wedges 38 may be mounted t the second clamping member 50 by welding, fasteners or any other suitable method known to those of ordinary skill in the art.

The second clamping member 50 includes a second upper portion 52 and a second lower portion 54 spaced from the second upper portion 52 with the second lower portion 54 defining a second groove 56. A plurality of stoppers 58 are mounted to the second lower portion 54 of the second clamping member 50 and face away from each other. In other words, the stoppers 58 extend away from each other and are spaced from each other and spaced from the pivot axis $P_1$. It is to be appreciated that the stoppers 58 and the second lower portion 54 may be integrally formed to each other or mounted to each other by welding, fasteners or any other suitable method known to those of ordinary skill in the art. The second upper portion 52, the second lower portion 54, the second groove 56 and the stoppers 58 will be discussed further below.

The first clamping member 48 includes a first upper portion 60 and a first lower portion 62 spaced from the first upper portion 60 with the first clamping member 48 coupled to the second clamping member 50. More specifically, the first upper portion 60 is disposed adjacent the second upper portion 52 and the first lower portion 62 is disposed adjacent the second lower portion 54. The first clamping member 48 further includes a mid-section 64 between the first upper portion 60 and the first lower portion 62. The mid-section 64 of the first clamping member 48 is coupled to the second clamping member 50 about the pivot axis $P_1$ such that the first clamping member 48 rotates about the pivot axis $P_1$. More specifically, the first clamping member 48 rotates about the pivot axis $P_1$ such that the first upper portion 60 rotates toward the second lower portion 54 and the first lower portion 62 rotates toward the second upper portion 52 for clamping the column jacket 22 therebetween. Preferably, the first upper portion 60, the first lower portion 62, and the mid-section 64 are integral with each other. However, it is to be appreciated that the first upper portion 60, the first lower portion 62, and the mid-section 64 may be mounted to each other by welding, fasteners or any other suitable method known to those of ordinary skill in the art. The first upper portion 60 of the first clamping member 48 defines a first groove 66 opposing the column jacket 22 and will be discussed further below.

The assembly 20 further includes a lever locking mechanism, generally indicated at 68, for the adjustable steering column having the column jacket 22 defining the longitudinal axis $L_1$ with the column jacket 22 moveable in at least one of the telescoping direction and the tilting direction. The lever locking mechanism 68 includes the first clamping member 48 adapted to be disposed along the longitudinal axis $L_1$ about the column jacket 22 and the second clamping member 50 adapted to be disposed along the longitudinal axis $L_1$ adjacent the first clamping member 48 about the column jacket 22. The lever locking mechanism 68 also includes the bracket 24 mounted to the vehicle as discussed above. It is to be appreciated that the lever locking mechanism 68 may include other components of the assembly 20.

The lever locking mechanism 68 further includes a lever 70 coupled to at least one of the first and second clamping members 48, 50. The lever 70 is rotatable about a lever axis $C_1$ between a set position for preventing movement of the column jacket 22 in at least one of the telescoping direction and the tilting direction and an adjustable position for allowing movement of the column jacket 22 in at least one of the telescoping direction and the tilting direction. The lever axis $C_1$ is disposed through the second clamping member 50. More specifically, the lever axis $C_1$ is disposed through the second lower portion 54 with the lever axis $C_1$ spaced from the pivot axis $P_1$ and extending transverse to the longitudinal axis $L_1$. The second wedges 38 are spaced between the pivot axis $P_1$ and the lever axis $C_1$ and the stoppers 58 are spaced from each other adjacent to the lever axis $C_1$.

Figure 4:
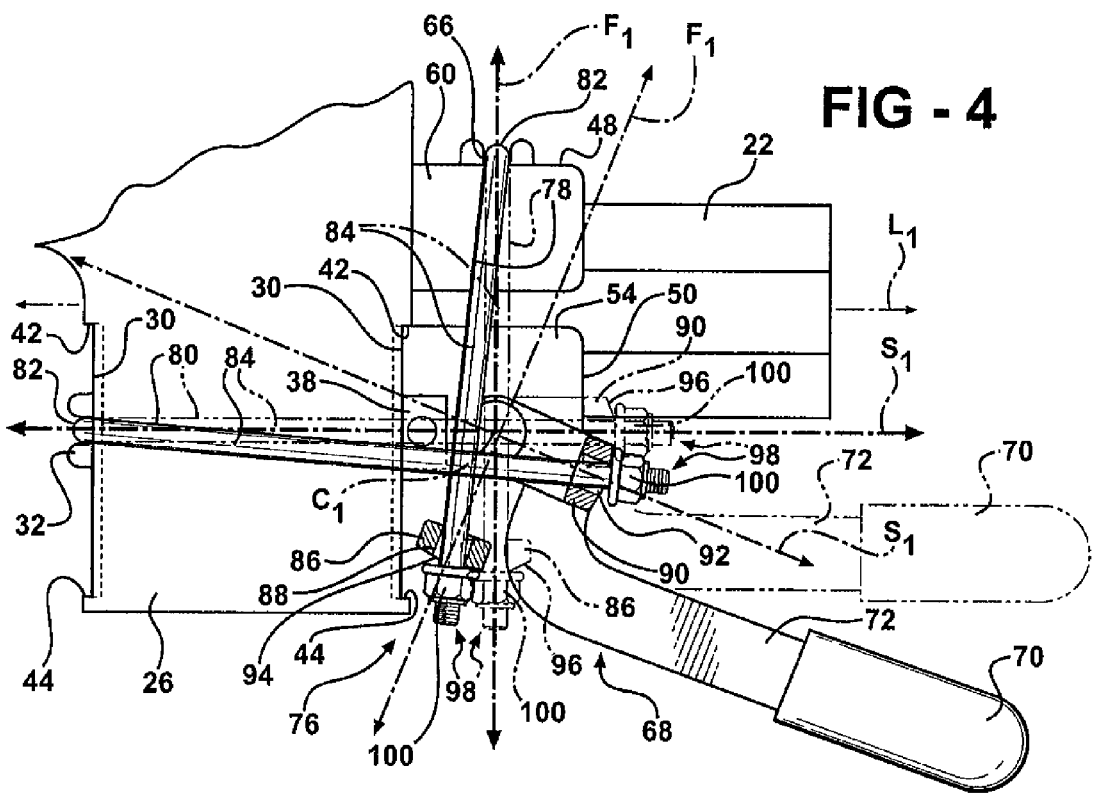
FIG. 4 is a side view of a lever moveable between a set position, as shown in phantom, for preventing movement of the column jacket and an adjustable position for allowing movement of the column jacket.

FIG. 4 shows the lever 70 in the adjustable position and also shows the lever 70 in phantom in the set position. More specifically, the lever 70 is mounted to the second clamping member 50 about the lever axis $C_1$ for allowing the lever 70 to rotate about the lever axis $C_1$ between the set and adjustable positions. In other words, the lever 70 rotates relative to the second clamping member 50. Preferably, the lever 70 rotates less than 35 degrees (35°) between the set and adjustable positions. More preferably, the lever 70 rotates less than 11 degrees (11°) between the set and adjustable positions. Most preferably, the lever 70 rotates 10 degrees (10°) or less between the set and adjustable positions.

The lever 70 includes a first arm 72 and a second arm 74 flanking the column jacket 22 and coupled to at least one of the first and second clamping members 48, 50. More specifically, the first and second arms 72, 74 flank the first and second clamping members 48, 50 with the first and second arms 72, 74 mounted to the second clamping member 50 and spaced from the first clamping member 48. When the lever 70 is in the set position, the first arm 72 abuts one of the stoppers 58 and the second arm 74 abuts an other one of the stoppers 58. When the lever 70 is in the adjustable position, the first and second arms 72, 74 are spaced from the stoppers 58.

The first and second arms 72, 74 each define a first axis $F_1$ extending substantially parallel to each other and extending transverse to and spaced from the longitudinal axis $L_1$. Each of the first and second arms 72, 74 further define a second axis $S_1$ extending substantially parallel to each other and spaced from the longitudinal axis $L_1$ with the second axis $S_1$ disposed at an angle relative to the first axis $F_1$. Preferably, the first axis $F_1$ and the second axis $S_1$ are disposed at 90 degrees (90°) relative to each other when moving between the locked and unlocked positions. However, it is to be appreciated that the first axis $F_1$ and the second axis $S_1$ may be disposed at any other suitable angle relative to each other. Further, the first axis $F_1$ and the second axis $S_1$ move relative to rotation of the lever 70 about the lever axis $C_1$. In other words, when the lever 70 rotates a predetermined degree, the first axis $F_1$ and the second axis $S_1$ rotate to a corresponding predetermined degree.

As shown in FIG. 5, the first axis $F_1$ of each of the arms 72, 74 and the second axis $S_1$ of each of the arms 72, 74 are spaced from each other along the longitudinal axis $L_1$ with the first axis $F_1$ of each of the arms 72, 74 disposed closer to the longitudinal axis $L_1$ than the second axis $S_1$ of each of the arms 72, 74. In other words, the second axis $S_1$ of each of the arms 72, 74 is disposed farther away from the longitudinal axis $L_1$ than the first axis $F_1$ of each of the arms 72, 74. Meaning, the first axis $F_1$ of each of the arms 72, 74 is disposed in a different plane from the second axis $S_1$ of each of the arms 72, 74. It is to be appreciated that the first axis $F_1$ of each of the arms 72, 74 may be disposed farther away from the longitudinal axis $L_1$ and the second axis $S_1$ of each of the arms 72, 74 may be disposed closer to the longitudinal axis $L_1$.

Referring back to FIGS. 1, 2 and 4, the clamping apparatus 46 and the lever locking mechanism 68 include a locking device, generally indicated at 76, coupled to the lever 70 and at least one of the first and second clamping members 48, 50. The locking device 76 is moveable between a locked position and an unlocked position during rotation of the lever 70 between the set and adjustable positions, respectively. The locked position prevents movement of the column jacket 22 in at least one of the telescoping direction and the tilting direction. The unlocked position allows movement of the column jacket 22 in at least one of the telescoping direction and the tilting direction. Preferably, the lever 70 rotates less than 35 degrees (35°) between the set and adjustable positions when moving the locking device 76 between the locked and unlocked positions, more preferably, the lever 70 rotates less than 11 degrees (11°). In other words, the lever 70 rotates 10 degrees (10°) or less between the set and adjustable positions when moving the locking device 76 between the locked and unlocked positions.

The first clamping member 48 is rotatable relative to the second clamping member 50 when the locking device 76 moves between the locked and unlocked positions for selectively allowing and preventing movement of the column jacket 22 in at least one of the telescoping direction and the tilting direction. The mid-section 64 of the first clamping member 48 is coupled to the second clamping member 50 such that movement of the locking device 76 to the locked position allows the first upper portion 60 to rotate toward the second lower portion 54 and the first lower portion 62 to rotate toward the second upper portion 52 for clamping the column jacket 22 therebetween.

A portion of the locking device 76 is disposed about at least one of the first and second clamping members 48, 50. The portion of the locking device 76 engages both of the first and second arms 72, 74 and at least one of the first and second clamping members 48, 50 such that rotation of the lever 70 moves the portion of the locking device 76 for minimizing rotation of the lever 70 between the set and adjustable positions when the locking device 76 moves between the locked and unlocked positions. The first groove 66 of the first upper portion 60 receives the portion of the locking device 76 and the second groove 56 of the second lower portion 54 receives an other portion of the locking device 76. Movement of the locking device 76 to the locked position allows the portion of the locking device 76 to rotate the first clamping member 48 for preventing movement of the column jacket 22 in the telescoping direction and allows the other portion of the locking device 76 to engage the second clamping member 50 for preventing movement of the column jacket 22 in the tilting direction.

The locking device 76 includes at least one first locking member 78 mounted to the lever 70 and at least one second locking member 80 disposed adjacent the first locking member 78 and mounted to the lever 70 with the locking members 78, 80 moveable between the locked position and the unlocked position during rotation of the lever 70 between the set and adjustable positions, respectively. The portion of the locking device 76 is further defined as the at least one first locking member 78 mounted to the first and second arms 72, 74 and disposed about both of the first and second clamping members 48, 50 for selectively allowing and preventing movement of the column jacket 22 in at least one of the telescoping direction and the tilting direction. The other portion of the locking device 76 is further defined as the at least one second locking member 80 mounted to the first and second arms 72, 74 and disposed about the second clamping member 50. Preferably, the first and second locking members 78, 80 are a U-shaped configuration. However, it is to be appreciated that the first and second locking members 78, 80 may be any configuration without deviating from the present invention.

The first locking member 78 is at least partially disposed along the first axis $F_1$ when the lever 70 is in the set position and the second locking member 80 is at least partially disposed along the second axis $S_1$ when the lever 70 is in the set position such that rotation of the lever 70 to the adjustment position moves the first locking member 78 away from the first axis $F_1$ and the second locking member 80 away from the second axis $S_1$ for minimizing rotation of the lever 70 when the locking device 76 moves between the locked and unlocked positions. The first locking member 78 is disposed about both of the first and second clamping members 48, 50 for selectively allowing and preventing movement of the column jacket 22 in the telescoping direction. The second locking member 80 is disposed about the first legs 26 for selectively allowing and preventing movement of the column jacket 22 in the tilting direction. More specifically, the second locking member 80 is disposed about the second lower portion 54 of the second clamping member 50 and the first legs 26.

The first wedges 32 are coupled to the second locking member 80 and more specifically, the second locking member 80 is disposed in the recess 34 of each of the first wedges 32 for supporting the first wedges 32 during movement of the locking device 76 between the locked and unlocked positions. Having the second locking member 80 disposed about the first legs 26 and supporting the first wedges 32 also aids in preventing movement of the column jacket 22 perpendicular to the tilting direction. In other words, the second locking member 80 aids in preventing movement of the column jacket 22 side to side, more specifically, prevents movement of the steering wheel side to side relative to the user.

The first and second locking members 78, 80 each include a body portion 82 having a pair of appendages 84 spaced from each other and extending away from the body portion 82. The body portion 82 of the first locking member 78 is coupled to the first clamping member 48 and the body portion 82 of the second locking member 80 is coupled to the second clamping member 50. More specifically, the body portion 82 of the first locking member 78 is coupled to the first groove 66 of the first clamping member 48 and the body portion 82 of the second locking member 80 is coupled to the second groove 56 of the second clamping member 50. Specifically, the body portion 82 of the first locking member 78 is coupled to the first groove 66 of the first upper portion 60 and the body portion 82 of the second locking member 80 is coupled to the second groove 56 of the second lower portion 54.

The body portion 82 of each of the first and second locking members 78, 80 extend transverse to the longitudinal axis $L_1$. The body portion 82 of the first locking member 78 defines a first length $X_1$ and the body portion 82 of the second locking member 80 defines a second length $X_2$ with the first length $X_1$ less than the second length $X_2$ for preventing the first and second locking members 78, 80 from interfering with each other when moving between the locked and unlocked positions. In other words, the appendages 84 of the first locking member 78 are disposed closer to the longitudinal axis $L_1$ than the appendages 84 of the second locking member 80 due to the first length $X_1$ being less than the second length $X_2$. It is to be appreciated that the first length $X_1$ of the body portion 82 of the first locking member 78 may be greater than the second length $X_2$ of the body portion 82 of the second locking member 80.

The appendages 84 of the first locking member 78 extend substantially parallel to each other away from the body portion 82 of the first locking member 78 such that the appendages 84 of the first locking member 78 flank the column jacket 22 and the first and second clamping members 48, 50. More specifically, the appendages 84 of the first locking member 78 extends transverse to the longitudinal axis $L_1$ when in the locked and unlocked positions. The appendages 84 of the second locking member 80 extend substantially parallel to each other away from the body portion 82 of the second locking member 80 such that the appendages 84 of the second locking member 80 flank the first legs 26 and the second lower portion 54 of the second clamping member 50. More specifically, the appendages 84 of the second locking member 80 extend substantially parallel to the longitudinal axis $L_1$ when in the locked position and transverse to the longitudinal axis $L_1$ when in the unlocked position.

The appendages 84 of the first locking member 78 and the first axis $F_1$ move away from each other when in the unlocked position. The appendages 84 of the second locking member 80 and the second axis $S_1$ move away from each other when in the unlocked position. In other words, the appendages 84 of the first locking member 78 and the first axis $F_1$ angle away from each other when in the unlocked position such that the first axis $F_1$ and the appendages 84 of the first locking member 78 cross each other. The appendages 84 of the second locking member 80 and the second axis $S_1$ angle away from each other when in the unlocked position such that the second axis $S_1$ and the appendages 84 of the second locking member 80 cross each other.

The appendages 84 of each of the first and second locking members 78, 80 define a radius. The radius of the appendages 84 of each of the locking members 78, 80 change as the appendages 84 move between the locked and unlocked positions. When the first and second locking members 78, 80 are in the locked position, pressure is applied to the first and second clamping member 48, 50 and the column jacket 22 for preventing movement of the column jacket 22. Rotation of the first locking member 78 away from the first axis $F_1$ changes the radius of the appendages 84 of the first locking member 78 and rotation of the second locking member 80 away from the second axis $S_1$ changes the radius of the appendages 84 of the second locking member 80 which creates play to move the column jacket 22 in the telescoping and tilting direction. More specifically, changing the radius of the appendages 84 of the first locking member 78 to the unlocked position rotates the first clamping member 48 to allow movement of the column jacket 22 in the telescoping direction. Further, changing the radius of the appendages 84 of the second locking member 80 moves the first and second wedges 32, 38 away from the first legs 26 for allowing movement of the column jacket 22 in the tilting direction. In other words, changing the radius of the appendages 84 of the first and second locking members 78, 80 to the unlocked position relieves pressure on the first and second clamping member 48, 50, the column jacket 22, the first and second wedges 32, 38, and the first legs 26 for allowing movement of the column jacket 22 in the telescoping and tilting directions.

Each of the first and second arms 72, 74 include a first protrusion 86 extending outwardly away from each other with the first locking member 78 mounted to the first protrusion 86 of each of the arms 72, 74. More specifically, the appendages 84 of the first locking member 78 are mounted to the first protrusion 86 of each of the arms 72, 74, respectively. In other words, one of the appendages 84 of the first locking member 78 is mounted to the first protrusion 86 of the first arm 72 and an other one of the appendages 84 of the first locking member 78 is mounted to the first protrusion 86 of the second arm 74. The first protrusion 86 of each of the arms 72, 74 is disposed through the first axis $F_1$ of each of the arms 72, 74.

The first protrusion 86 of each of the arms 72, 74 defines a first aperture 88 disposed along the first axis $F_1$. One of the appendages 84 of the first locking member 78 is disposed through the first aperture 88 of the first arm 72 and an other one of the appendages 84 of the first locking member 78 is disposed through the first aperture 88 of the second arm 74 for mounting the first locking member 78 to the arms 72, 74. The first aperture 88 of each of the arms 72, 74 is configured to allow the appendages 84 of the first locking member 78 to shift within the first aperture 88 during movement of the locking device 76 between the locked and unlocked positions such that the appendages 84 of the first locking member 78 and the first axis $F_1$ cross each other proximal to the first protrusion 86 of each of the first arms 72 when in the unlocked position. In other words, the first aperture 88 is configured larger than the appendages 84 of the first locking member 78 such that the appendages 84 abut a part of the first protrusion 86 within the first aperture 88 when in the unlocked position.

Each of the first and second arms 72, 74 further include a second protrusion 90 extending outwardly away from each other and spaced from the first protrusion 86 of each of the arms 72, 74 with the second locking member 80 mounted to the second protrusion 90 of each of the arms 72, 74. More specifically, the appendages 84 of the second locking member 80 are mounted to the second protrusion 90 of each of the arms 72, 74, respectively. In other words, one of the appendages 84 of the second locking member 80 is mounted to the second protrusion 90 of the first arm 72 and an other one of the appendages 84 of the second locking member 80 is mounted to the second protrusion 90 of the second arm 74. The second protrusion 90 of each of the arms 72, 74 is disposed along the second axis $S_1$ of each of the arms 72, 74. The first and second protrusions 86, 90 of the first arm 72 are disposed adjacent one another and the first and second protrusions 86, 90 of the second arm 74 are disposed adjacent one another. In other words, the first and second protrusions 86, 90 of each of the arms 72, 74 are spaced and offset from each other. The appendages 84 of the first and second locking members 78, 80 are mounted to the first and second protrusion 86, 90 of each of the arms 72, 74, respectively such that the locking device 76 moves between the locked and unlocked positions without the first locking member 78 interfering with the second locking member 80 for minimizing rotation of the lever 70 between the set and adjustable positions.

The second protrusion 90 of each of the arms 72, 74 define a second aperture 92 disposed along the second axis. One of the appendages 84 of the second locking member 80 is disposed through the second aperture 92 of the first arm 72 and an other one of the appendages 84 of the second locking member 80 is disposed through the second aperture 92 of the second arm 74 for mounting the second locking member 80 to the arms 72, 74. The second aperture 92 of each of the arms 72, 74 is configured to allow the appendages 84 of the second locking member 80 to shift within the second aperture 92 during movement of the locking device 76 between the locked and unlocked positions such that the appendages 84 of the second locking member 80 and the second axis $S_1$ cross each other proximal to the second protrusion 90 of each of the second arms 74 when in the unlocked position. In other words, the second aperture 92 is configured larger than the appendages 84 of the second locking member 80 such that the appendages 84 abut a part of the second protrusion 90 within the second aperture 92 when in the unlocked position.

As best shown in FIGS. 2, 4 and 5, the first and second protrusions 86, 90 of each of the first and second arms 72, 74 define a locking surface 94 and an adjusting surface 96 adjacent the locking surface 94. The locking surface 94 of the first protrusions 86 are disposed adjacent the first aperture 88 and the locking surface 94 of the second protrusions 90 are disposed adjacent the second aperture 92. The locking device 76 further includes a plurality of fasteners 98 coupled to at least one of the first and second locking members 78, 80. More specifically, the fasteners 98 are coupled to each of the first and second locking members 78, 80 for securing the first and second locking members 78, 80 to the lever 70. Most specifically, the fasteners 98 are coupled to the appendages 84 of each of the first and second locking members 78, 80 for securing the first and second locking members 78, 80 to the lever 70. Further, the fasteners 98 are adjustable for reducing tolerance requirements of the assembly 20. The locking device 76 of this embodiment includes both the first and second locking members 78, 80 and the fasteners 98. The fasteners 98 are moveable along the locking surface 94 and the adjustable surface of the first and second protrusions 86, 90 of each of the first and second arms 72, 74. Referring to FIGS. 6, 8, 10 and 11, the fasteners 98 are disposed along the locking surface 94 when the lever 70 is in the set position and referring to FIGS. 7, 9 and 12, the fasteners 98 are disposed along the adjusting surface 96 when the lever 70 is in the adjustable position.

FIGS. 6-12 is an illustration of only one of the appendages 84 of the first locking member 78 disposed through the first aperture 88 of the first protrusion 86 with the fastener 98 coupled thereon. However this illustration is representative of any of the appendages 84 of the first and second locking members 78, 80 and any of the first and second protrusions 86, 90 of the arms 72, 74. It is to be further appreciated that the fasteners 98, the locking surface 94, and the adjusting surface 96 may be different for the first protrusion 86 of each of the arms 72, 74 and the second protrusion 90 of each of the arms 72, 74.

Figure 6:
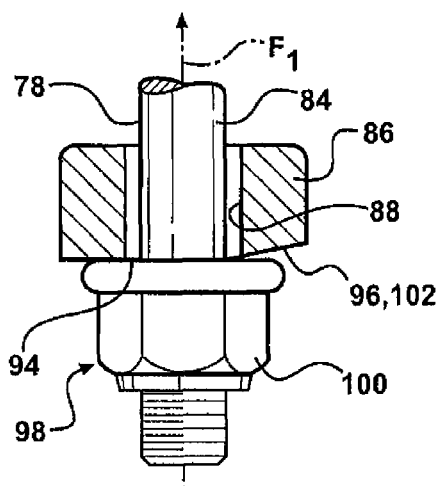
FIG. 6 is an enlarged view of an appendage of a first locking member coupled to a first protrusion in a locked position with a nut abutting a locking surface and a flat cam surface spaced from the nut.
Figure 7:
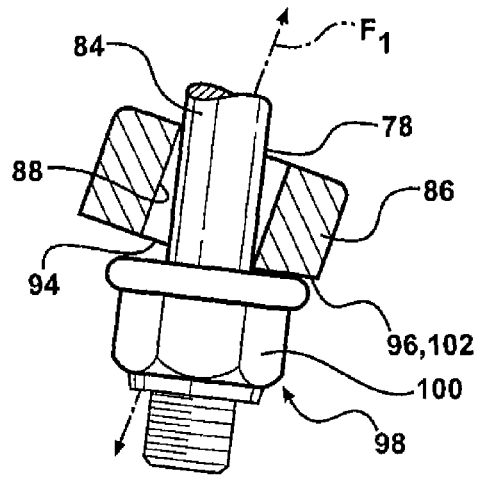
FIG. 7 is an enlarged view of the appendage of the first locking member coupled to the first protrusion in an unlocked position with the flat cam surface abutting the nut.

In the embodiment as shown in FIGS. 6 and 7, the fastener 98 is defined as a nut 100 and the adjusting surface 96 is defined as a flat cam surface 102 extending away from the nut 100. FIG. 6 shows the appendage 84 of the first locking member 78 in the locked position with the nut 100 abutting the locking surface 94 of the first protrusion 86. FIG. 7 shows the appendage 84 of the first locking member 78 in the unlocked position with the nut 100 abutting the flat cam surface 102 of the first protrusion 86. The nut 100 toggles over the flat cam surface 102 without the nut 100 sliding along the flat cam surface 102 for preventing wear between the nut 100 and the first protrusion 86. The first aperture 88 of each of the arms 72, 74 is configured to allow the appendages 84 of the first locking member 78 to shift within the first aperture 88 during movement of the locking device 76 between the locked and unlocked positions such that the appendages 84 abut the part of the first protrusion 86 within the first aperture 88 when in the unlocked position. It is to be appreciated that the flat cam surface 102 may be defined as an arcuate surface (not shown) such that the nut 100 rolls over the arcuate surface without the nut 100 sliding along the arcuate surface for preventing wear between the nut 100 and the first protrusion 86.

Figure 8:
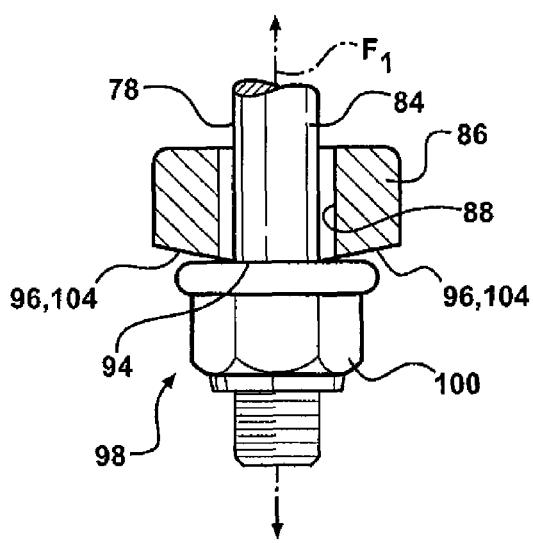
FIG. 8 is an enlarged view of the appendage of the first locking member coupled to the first protrusion in the locked position with the nut abutting the locking surface and a full radius cam surface spaced from the nut.
Figure 9:
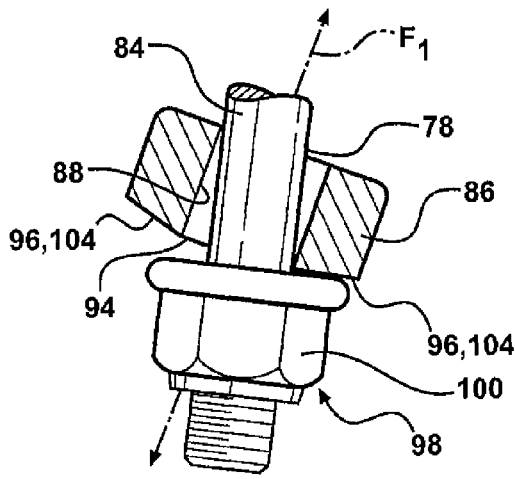
FIG. 9 is an enlarged view of the appendage of the first locking member coupled to the first protrusion in the unlocked position with the full radius cam surface abutting the nut.

In the embodiment shown in FIGS. 8 and 9, the fastener 98 is defined as the nut 100 and the adjusting surface 96 is defined as a full radius cam surface 104 extending away from the nut 100. FIG. 8 shows the appendage 84 of the first locking member 78 in the locked position with the nut 100 abutting the locking surface 94 of the first protrusion 86. FIG. 9 shows the appendage 84 of the first locking member 78 in the unlocked position with the nut 100 abutting the full radius cam surface 104 of the first protrusion 86. The nut 100 rolls over the full radius cam surface 104 without the nut 100 sliding along the full radius cam surface 104 for preventing wear between the nut 100 and the first protrusion 86. The first aperture 88 of each of the arms 72, 74 is configured to allow the appendages 84 of the first locking member 78 to shift within the first aperture 88 during movement of the locking device 76 between the locked and unlocked positions such that the appendages 84 abut the part of the first protrusion 86 within the first aperture 88 when in the unlocked position.

Figure 10:
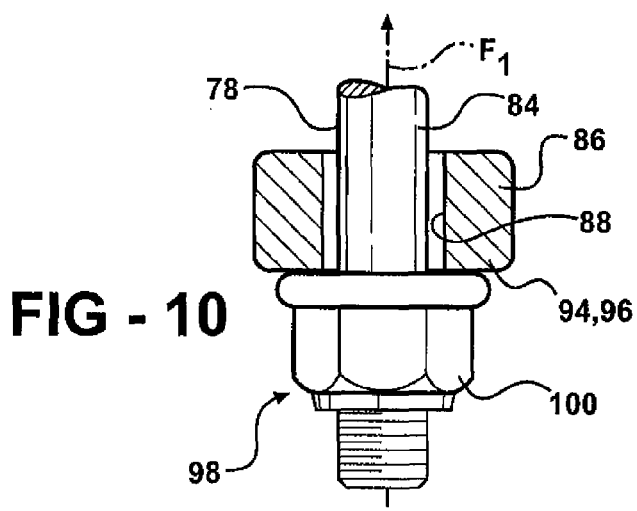
FIG. 10 is an enlarged view of the appendage of the first locking member coupled to the first protrusion in the locked position with the nut abutting the locking surface.

In another embodiment as shown in FIG. 10, the fastener 98 is defined as the nut 100 and the flat cam surface 102 is eliminated. The locking surface 94 and the adjusting surface 96 are the same in this embodiment. The first protrusion 86 is coupled to the first and second arms 72, 74 such that the first protrusion 86 rotates toward the nut 100 when the lever 70 rotates to the set position. As shown in FIG. 10, the nut 100 engages or abuts the locking surface 94 when in the set position. The first protrusion 86 rotates away from the nut 100 when the lever 70 rotates to the adjustable position such that the nut 100 is spaced from the locking surface 94. This is commonly referred to as a pivoting reactor to those of ordinary skill in the art.

Figure 11:
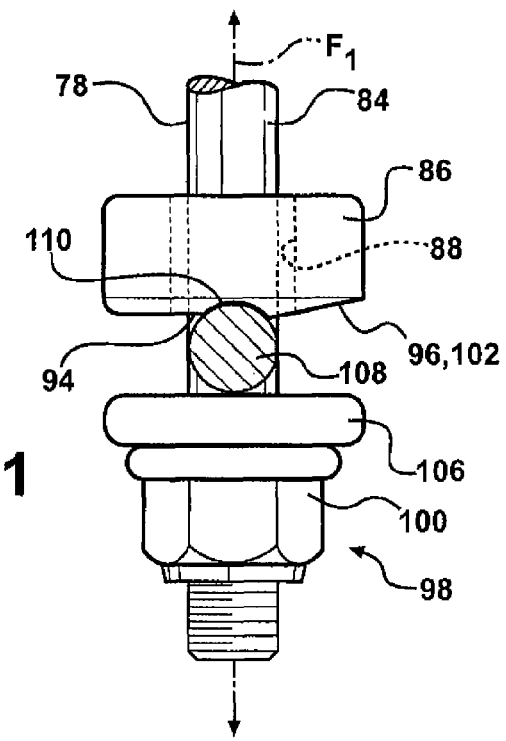
FIG. 11 is an enlarged view of the appendage of the first locking member coupled to the first protrusion in the locked position with a roller disposed in a dimple.
Figure 12:
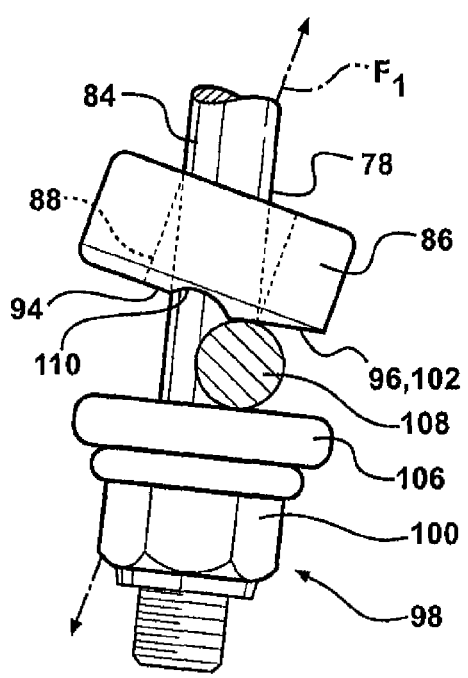
FIG. 12 is an enlarged view of the appendage of the first locking member coupled to the first protrusion in the unlocked position with the roller spaced from the dimple.
Figure 13:
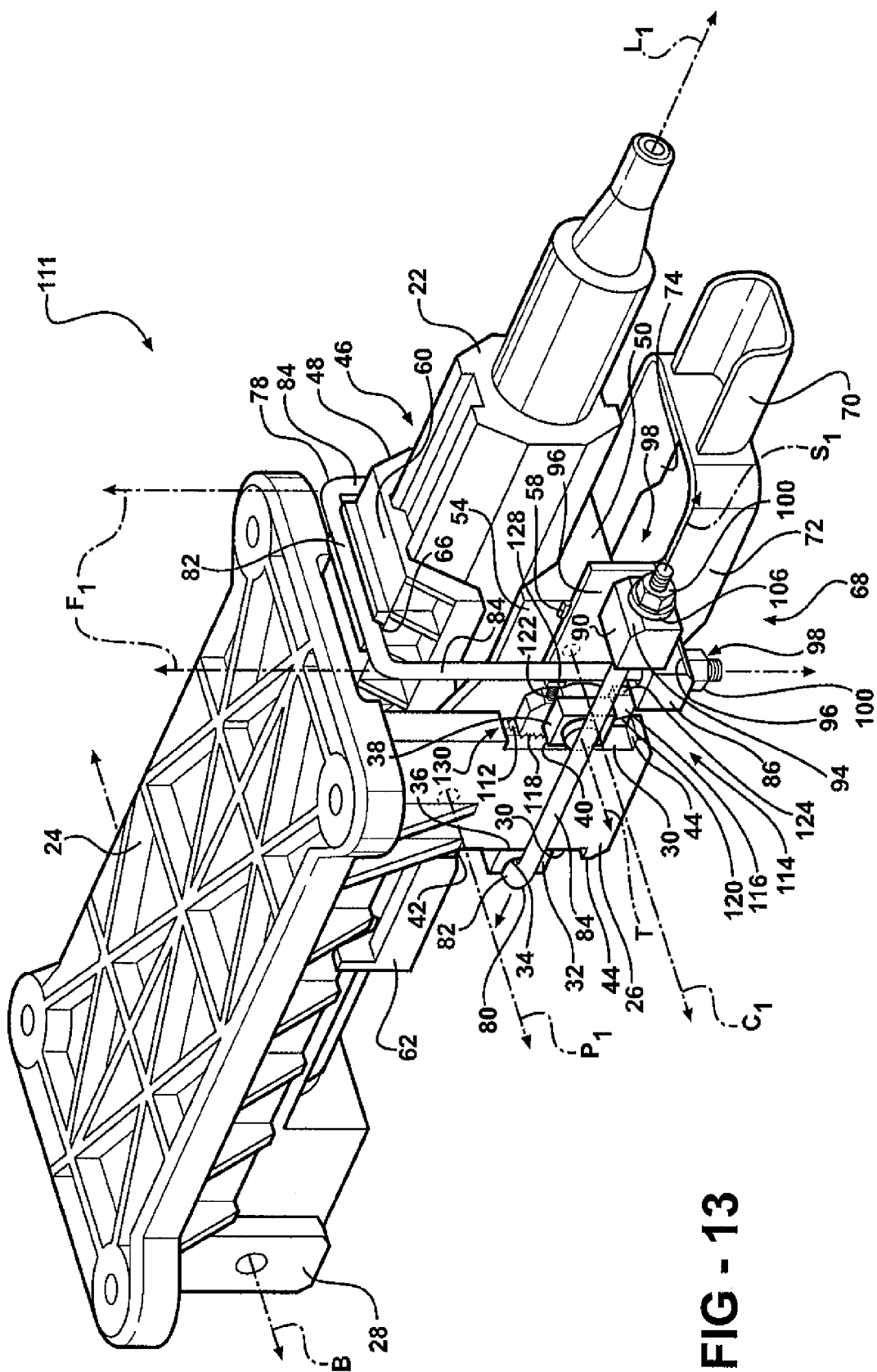
FIG. 13 is a perspective view of an adjustable steering column assembly of a second embodiment.
Figure 14:
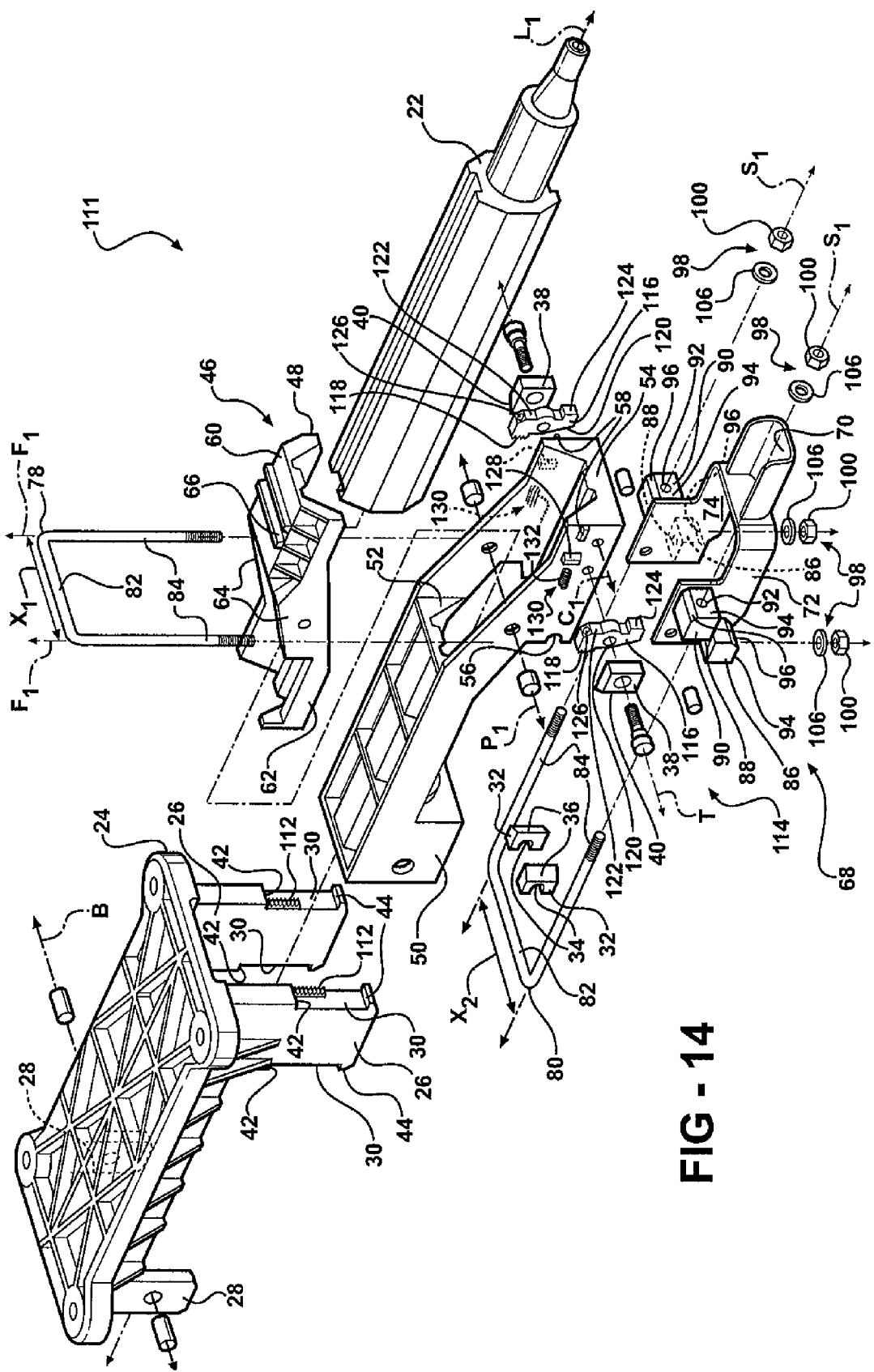
FIG. 14 is an exploded view of the adjustable steering column assembly of the second embodiment.

In the embodiment shown in FIGS. 11 and 12, the fastener 98 is defined as the nut 100 and a washer 106 abutting the nut 100 with a roller 108 moveable along the washer 106. More specifically, the roller 108 is spaced from the nut 100 and disposed between the washer 106 and the first protrusion 86. The adjusting surface 96 is defined as the flat cam surface 102 and extends away from the washer 106. The adjusting surface 96 may be defined as the flat cam surface 102 or any other surface for allowing the roller 108 to roll along the washer 106 and the adjusting surface 96. The first protrusion 86 defines a dimple 110 adjacent the flat cam surface 102 and the first aperture 88 for receiving the roller 108 when the lever 70 is in the set position. As shown in FIG. 11, the roller 108 is disposed in the dimple 110 when the lever 70 is in the set position. As shown in FIG. 12, the roller 108 moves along the washer 106 and the flat cam surface 102 when the lever 70 is in the adjustment position. The first aperture 88 of each of the arms 72, 74 is configured to allow the appendages 84 of the first locking member 78 to shift within the first aperture 88 during movement of the locking device 76 between the locked and unlocked positions such that the appendages 84 abut the part of the first protrusion 86 within the first aperture 88 when in the unlocked position.

For illustrative purposes only, an example of the locking device 76 moving between the locked and unlocked positions in response to rotation of the lever 70 between the set and adjustable positions is discussed below. When the lever 70 is in the set position, the first and second arms 72, 74 abut the stoppers 58 and the locking device 76 is in the locked position for preventing movement of the column jacket 22 in the telescoping and tilting directions. The fasteners 98 engage the locking surface 94 of each of the first and second protrusions 86, 90 of the arms 72, 74. The appendages 84 of the first and second locking members 78, 80 are disposed along the first and second axes $F_1, S_1$, respectively when the lever 70 is in the set position. The first clamping member 48 rotates about the pivot axis $P_1$ such that the first and second clamping members 48, 50 clamp the column jacket 22 therebetween for preventing movement of the column jacket 22 in the telescoping direction. In other words, pressure is applied to the first and second clamping members 48, 50, the column jacket 22, the first and second wedges 32, 38, and the first legs 26 for preventing movement of the column jacket 22. The first upper portion 60 and the column jacket 22 are sandwiched between the first locking member 78 and the second lower portion 54 of the second clamping member 50. The first and second wedges 32, 38 engage the first legs 26, more specifically, the first angled surface 36 of the first wedges 32 engage the sloped surfaces 30 facing the second legs 28 and the second angled surface 40 of the second wedges 38 engage the sloped surfaces 30 facing away from the second legs 28 for preventing movement of the column jacket 22 in the tilting direction. In other words, pressure is applied to the first and second wedges 32, 38 and the first legs 26.

When the lever 70 is in the adjustable position, the locking device 76 is in the unlocked position for allowing movement of the column jacket 22 in the telescoping and tilting directions. The lever 70 rotates about the lever axis $C_1$ to the adjustable position and the first and second arms 72, 74 rotate away from the stoppers 58. The fasteners 98 engage the adjusting surface 96 of each of the first and second protrusions 86, 90 of each of the arms 72, 74. The appendages 84 of the first and second locking members 78, 80 move away from the first and second axes $F_1, S_1$, respectively when the lever 70 is in the adjustable position such that the appendages 84 of the first locking member 78 crosses the first axis $F_1$ proximal the first protrusion 86 and the appendages 84 of the second locking member 80 crosses the second axis $S_1$ proximal the second protrusion 90. The first locking member 78 relieves the pressure on the first upper portion 60 which allows the first upper portion 60 to rotate away from the second lower portion 54 and the first lower portion 62 to rotate away from the second upper portion 52 for unclamping the column jacket 22 therebetween for allowing movement of the column jacket 22 in the telescoping direction. Rotation of the first locking member 78 away from the first axis $F_1$ changes the radius of the appendages 84 of the first locking member 78 and rotation of the second locking member 80 away from the second axis $S_1$ changes the radius of the appendages 84 of the second locking member 80. Changing the radius of the appendages 84 of the first and second locking members 78, 80 to the unlocked position relieves pressure on the first and second clamping members 48, 50, the column jacket 22, the first and second wedges 32, 38, and the first legs 26 for allowing movement of the column jacket 22 in the telescoping and tilting directions. The first and second clamping members 48, 50 unclamp the column jacket 22 such that the column jacket 22 may slide within the first and second clamping members 48, 50 in the telescoping direction. The first and second wedges 32, 38 move away from the first legs 26 such that the first and second wedges 32, 38 slide along the sloped surfaces 30 of the first legs 26 during movement of the column jacket 22 in the tilting direction.

Referring to FIGS. 13-16, a second embodiment of an adjustable steering column assembly 111 for a vehicle, wherein like reference numerals indicate like or corresponding parts throughout the several views, is generally shown. Identical or similar components discussed in the first embodiment of the assembly 20 have the same reference numerals in this embodiment and additional or different components of this embodiment have different reference numerals. In this embodiment of the assembly 111 and as similarly discussed in the first embodiment of the assembly 20, the second clamping member 50 is rotatable about the bracket axis B for tilting the column jacket 22, which is commonly known to those of ordinary skill in the art as raking. Further, as similarly discussed in the first embodiment of the assembly 20, the first and second locking members 78, 80 of this embodiment of the assembly 111 each include the body portion 82 having the pair of appendages 84 with the body portion 82 of the first locking member 78 coupled to the first clamping member 48 and the body portion 82 of the second locking member 80 coupled to the second clamping member 50.

The primary distinction between the first embodiment of the assembly 20 and this embodiment of the assembly 111 is each of the first legs 26 of the bracket 24 include a plurality of teeth 112 and a locking device, generally indicated at 114, includes a plurality of locking tabs 116 coupled to the second clamping member 50. The locking tabs 116 include a plurality of teeth 118 configured to cooperate with the teeth 112 of the first legs 26 for selectively allowing and preventing movement of the column jacket 22 in the tilting direction. The teeth 112 of the first legs 26 extend from the upper shoulders 42 to a predetermined distance spaced from the lower shoulders 44. However it is to be appreciated that the teeth 112 of the first legs 26 may extend from the upper shoulders 42 to the lower shoulders 44.

The teeth 112 of each of the first legs 26 are disposed adjacent the pair of sloped surfaces 30 facing away from the second legs 28 such that the locking tabs 116 are disposed adjacent the second wedges 38. The locking tabs 116 are disposed between the second clamping member 50 and the second wedges 38 such that the teeth 118 of the locking tabs 116 face the teeth 112 of the first legs 26 and the second angled surface 40 of each of the second wedges 38 face the pair of sloped surfaces 30 of the first legs 26. The second lower portion 54 of the second clamping member 50 defines a tab axis T disposed between the pivot axis $P_1$ and the lever axis $C_1$ with the tab axis T extending transverse to the longitudinal axis $L_1$. The locking tabs 116 are coupled to the second clamping member 50 about the tab axis T for allowing the locking tabs 116 to rotate about the tab axis T. The locking tabs 116 are coupled to the second clamping member 50 by any suitable fasteners known to those of ordinary skill in the art which allows the locking tabs 116 to rotate relative to the second clamping member 50.

Each of the locking tabs 116 include a front surface 120 and a back surface 122 spaced from each other with the teeth 118 of the locking tabs 116 disposed on the front surface 120. Each of the locking tabs 116 include a projection 124 spaced from the teeth 118 of the locking tabs 116 such that rotation of the lever 70 to the adjustable position allows the first protrusion 86 of the first arm 72 to engage the projection 124 of one of the locking tabs 116 and the first protrusion 86 of the second arm 74 to engage the projection 124 of an other one of the locking tabs 116 for rotating the locking tabs 116 to disengage the teeth 118 of the locking tabs 116 from the teeth 112 of the first legs 26. More specifically, the projection 124 of each of the locking tabs 116 are disposed on the back surface 122 such that the projection 124 of one of the locking tabs 116 engage the first protrusion 86 of the first arm 72 and the projection 124 of an other one of the locking tabs 116 engage the first protrusion 86 of the second arm 74. The projection 124 of each of the locking tabs 116 engage the first protrusion 86 spaced from the first aperture 88 of the first arm 72 and spaced from the first aperture 88 of the second arm 74 such that the locking tabs 116 rotate about the tab axis T.

Each of the locking tabs 116 also define a cavity 126 opposing the teeth 118 of the locking tabs 116. More specifically, the cavity 126 is disposed in the back surface 122 of the locking tabs 116 and spaced from the projection 124. The cavity 126 will be discussed further below.

The second clamping member 50 further includes a plurality of flanges 128 spaced from each other and spaced from the stoppers 58. More specifically, the second lower portion 54 includes the flanges 128 extending outwardly away from the second lower portion 54. The flanges 128 face the back surface 122 of the locking tabs 116 such that rotation of the locking tabs 116 allows the back surface 122 to move toward and away from the flanges 128.

The locking device 114 further includes a biasing member, generally indicated at 130, coupled to each of the locking tabs 116 and the second clamping member 50. More specifically, the biasing member 130 abuts the flanges 128 and the locking tabs 116. Preferably, the biasing member 130 is defined as a spring 132. However it is to be appreciated that the biasing member 130 may be any member that biases the locking tabs 116 into the locked position. The cavity 126 opposes the teeth 118 of the locking tabs 116 for receiving and supporting the biasing member 130. The cavity 126 and the flanges 128 cooperate with each other such that the biasing member 130 biases the teeth 118 of the locking tabs 116 into engagement with the teeth 112 of the first legs 26 when the locking device 114 is in the locked position. It is to be appreciated that the cavity 126 may be disposed in the flanges 128 and eliminated from the locking tabs 116 or both the locking tabs 116 and the flanges 128 may define the cavity 126.

The assembly 111 further includes the clamping apparatus 46 and the lever locking mechanism 68 as discussed in the first embodiment of the assembly 20. The locking device 114 in this embodiment includes the first and second locking members 78, 80, the fasteners 98, the locking tabs 116, and the biasing member 130. For illustrative purposes only, an example of the locking device 114 moving between the locked and unlocked positions in response to rotation of the lever 70 between the set and adjustable positions is discussed below. Preferably, the lever 70 rotates less than 35 degrees (35°) between the set and adjustable positions when moving the locking device 114 between the locked and unlocked positions, more preferably, the lever 70 rotates less than 11 degrees (11°). Most preferably, the lever 70 rotates 10 degrees (10°) or less between the set and adjustable positions when moving the locking device 114 between the locked and unlocked positions.

Figure 15:
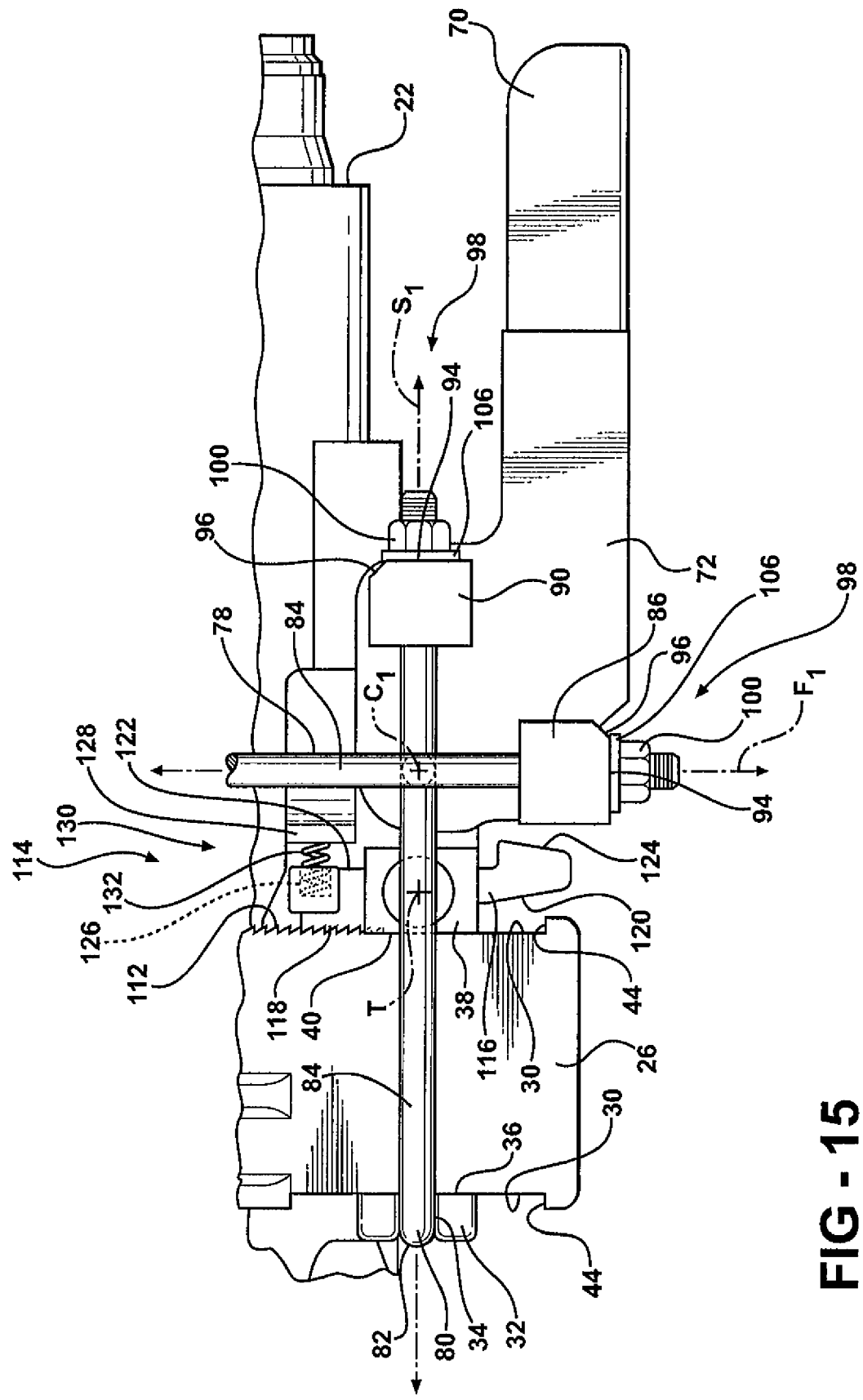
FIG. 15 is an enlarged view of a locking device in a locked position and a lever in a set position of the second embodiment.

Referring to FIG. 15, the locking device 114 is shown in the locked position and the lever 70 is shown in the set position for preventing movement of the column jacket 22 in the telescoping and tilting directions. When the lever 70 is in the set position, the first and second arms 72, 74 abut the stoppers 58. The fasteners 98 engage the locking surface 94 of each of the first and second protrusions 86, 90 of the arms 72, 74. The appendages 84 of the first and second locking members 78, 80 are disposed along the first and second axes $F_1$, $S_1$, respectively when the lever 70 is in the set position. When the first and second locking members 78, 80 are in the locked position, pressure is applied to the first and second clamping members 48, 50 and the column jacket 22 for preventing movement of the column jacket 22. The first clamping member 48 rotates about the pivot axis $P_1$ such that the first and second clamping members 48, 50 clamp the column jacket 22 therebetween for preventing movement of the column jacket 22 in the telescoping direction. In other words, the first upper portion 60 and the column jacket 22 are sandwiched between the first locking member 78 and the second lower portion 54 of the second clamping member 50. The first and second wedges 32, 38 engage the first legs 26, more specifically, the first angled surface 36 of the first wedges 32 engage the sloped surfaces 30 facing the second legs 28 and the second angled surface 40 of the second wedges 38 engage the sloped surfaces 30 facing away from the second legs 28 for aiding in preventing movement of the column jacket 22 in the tilting direction and for aiding in preventing movement of the column jacket 22 side to side. In other words, pressure is applied to the first and second wedges 32, 38 and the first legs 26. The projection 124 of each of the locking tabs 116 is spaced from the first protrusion 86 of each of the arms 72, 74 with the biasing member 130 of each of the locking tabs 116 biasing the teeth 118 of the locking tabs 116 into engagement with the teeth 112 of the first legs 26 for preventing movement of the column jacket 22 in the tilting direction.

Figure 16:
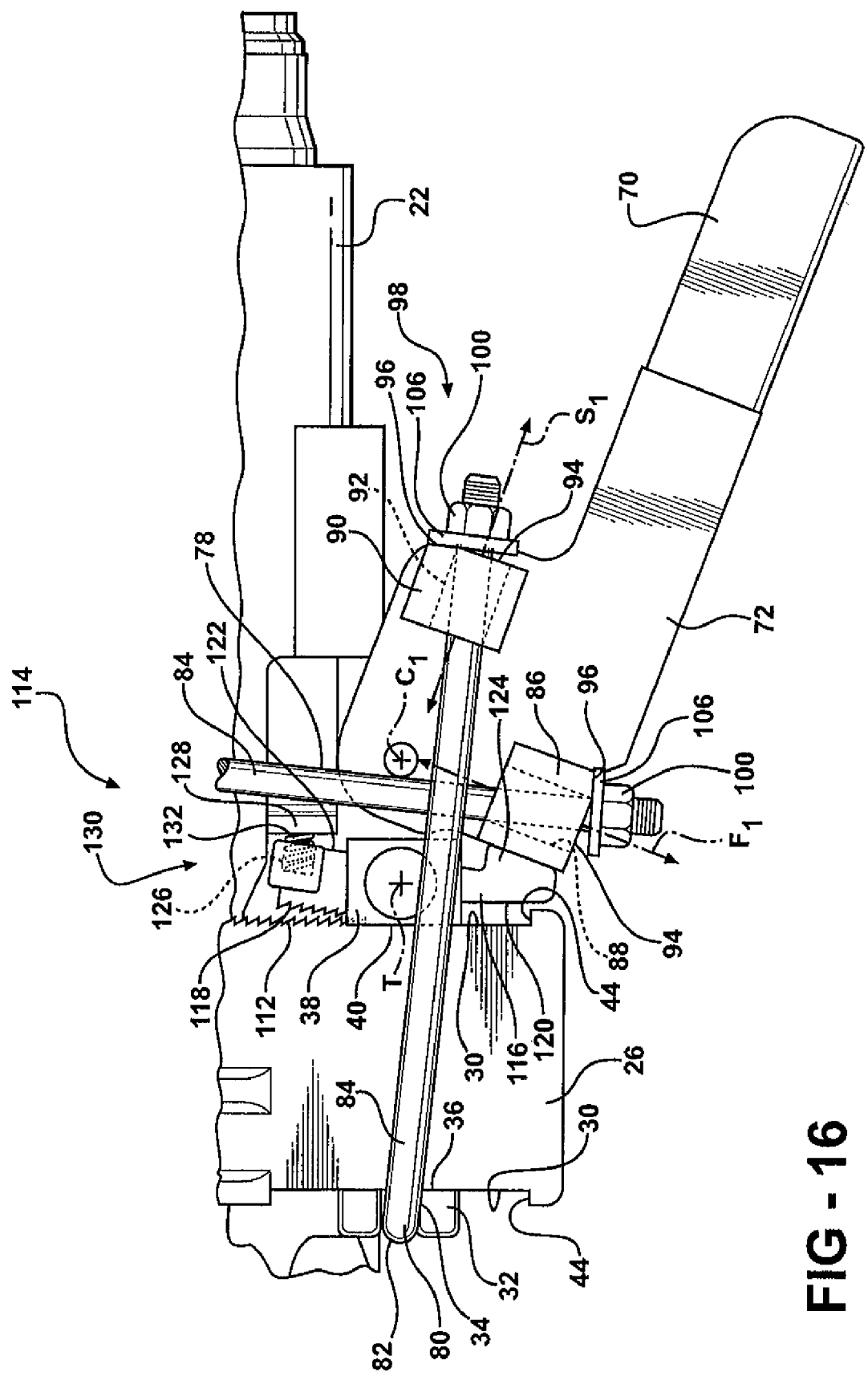
FIG. 16 is an enlarged view of the locking device in an unlocked position and the lever in an adjustable position of the second embodiment.
Figure 17:
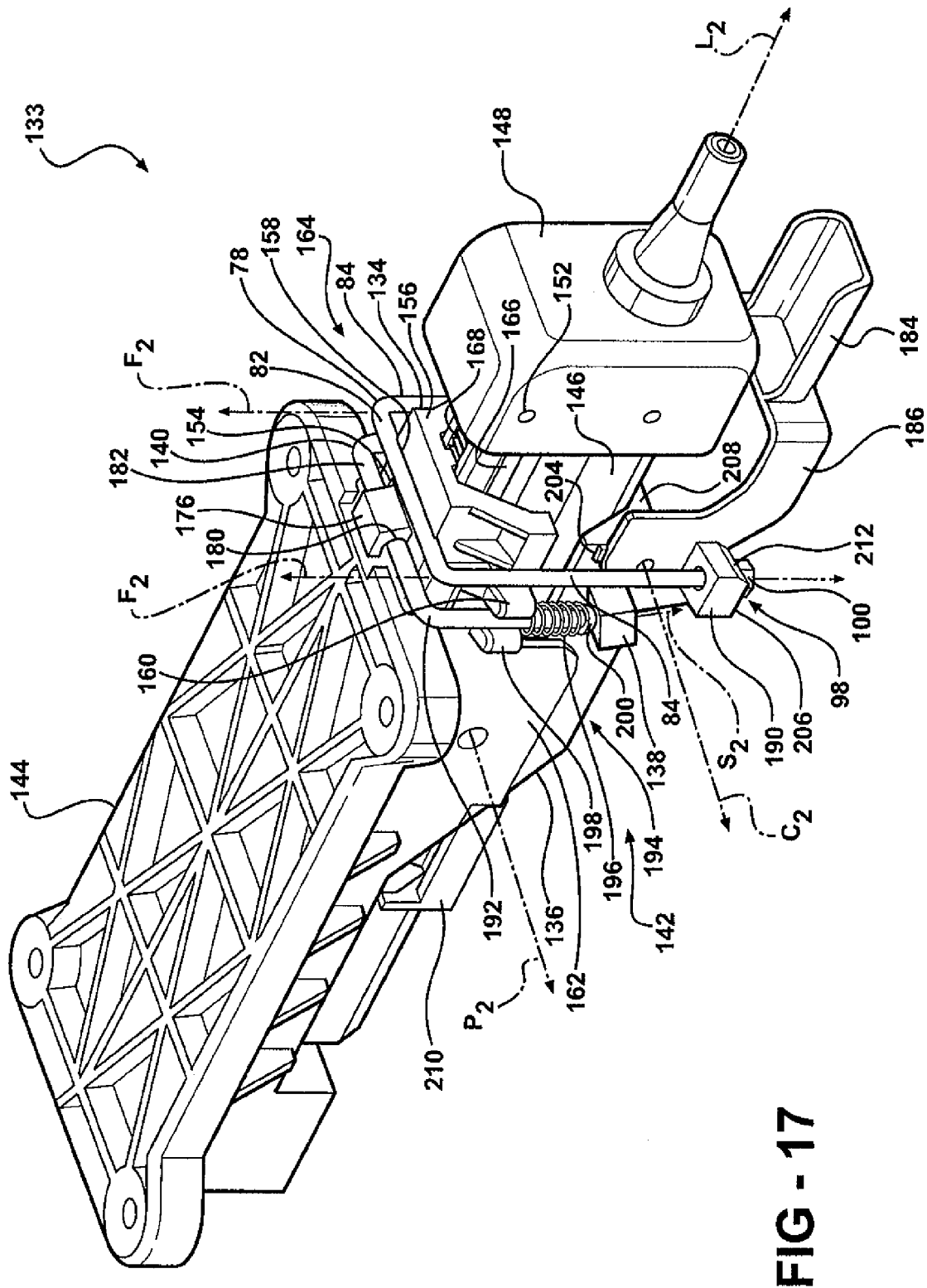
FIG. 17 is a perspective view of an adjustable steering column assembly of a third embodiment.
Figure 18:
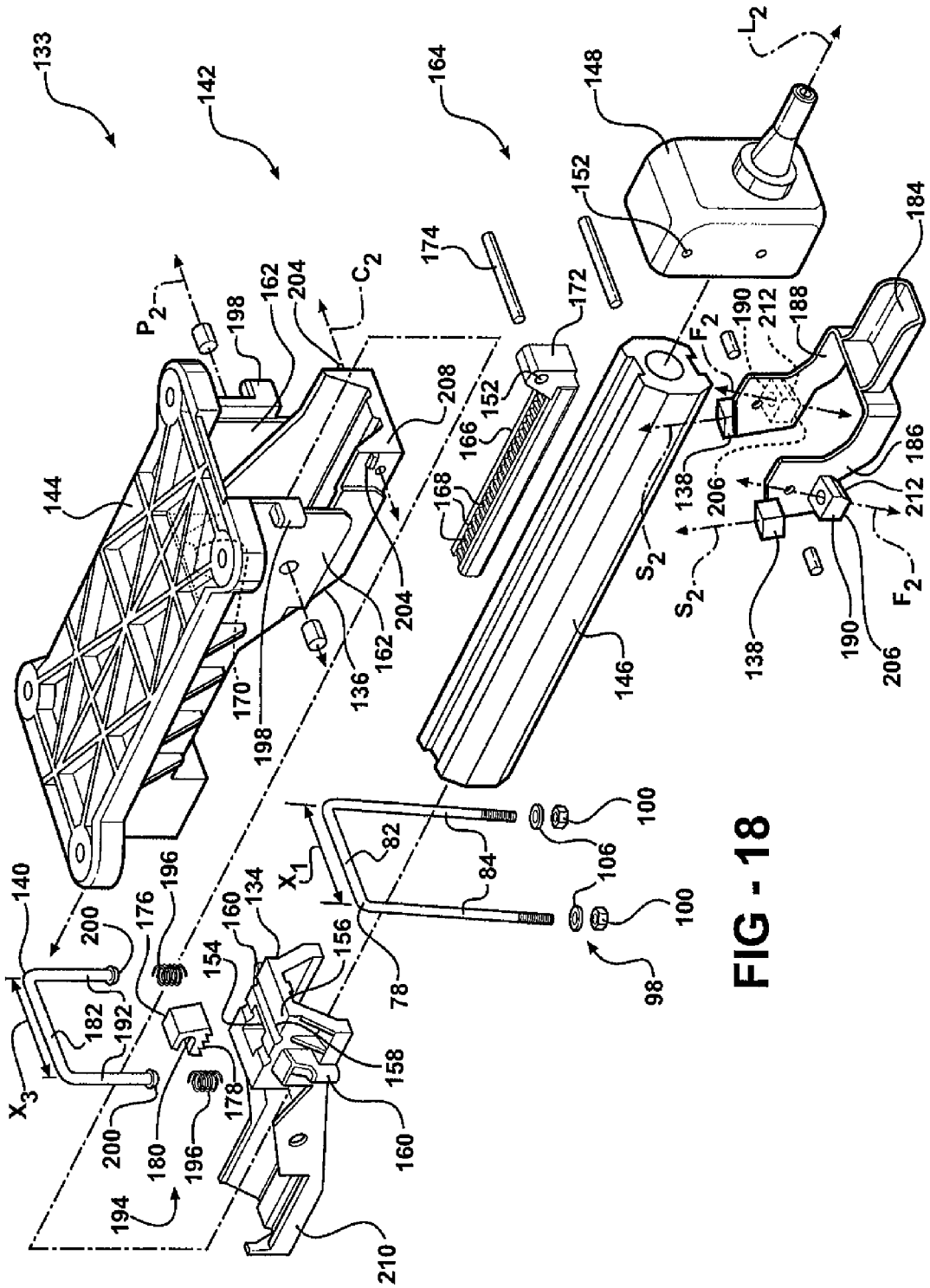
FIG. 18 is an exploded view of the adjustable steering column assembly of the third embodiment.

Referring to FIG. 16, the locking device 114 is shown in the unlocked position and the lever 70 is shown in the adjustable position for allowing movement of the column jacket 22 in the telescoping and tilting directions. The lever 70 rotates about the lever axis $C_1$ to the adjustable position and the first and second arms 72, 74 rotate away from the stoppers 58. The fasteners 98 engage the adjusting surface 96 of each of the first and second protrusions 86, 90 of the arms 72, 74. The appendages 84 of the first and second locking members 78, 80 move away from the first and second axes $F_1$, $S_1$, respectively when the lever 70 is in the adjustable position such that the appendages 84 of the first locking member 78 crosses the first axis $F_1$ proximal to the first protrusion 86 and the appendages 84 of the second locking member 80 crosses the second axis $S_1$ proximal to the second protrusion 90. The first locking member 78 relieves the pressure on the first upper portion 60 which allows the first upper portion 60 to rotate away from the second lower portion 54 and the first lower portion 62 to rotate away from the second upper portion 52 for unclamping the column jacket 22 therebetween for allowing movement of the column jacket 22 in the telescoping direction. Rotation of the first locking member 78 away from the first axis $F_1$ changes the radius of the appendages 84 of the first locking member 78 and rotation of the second locking member 80 away from the second axis $S_1$ changes the radius of the appendages 84 of the second locking member 80. Changing the radius of the appendages 84 of the first and second locking members 78, 80 to the unlocked position relieves pressure on the first and second clamping members 48, 50, the column jacket 22, the first and second wedges 32, 38 and the first legs 26 for allowing movement of the column jacket 22 in the telescoping and tilting directions. The first and second clamping members 48, 50 unclamp the column jacket 22 such that the column jacket 22 may slide within the first and second clamping members 48, 50 in the telescoping direction. The first and second wedges 32, 38 move away from the first legs 26 such that the first and second wedges 32, 38 slide along the sloped surfaces 30 of the first legs 26 during movement of the column jacket 22 in the tilting direction. The projection 124 of one of the locking tabs 116 engage the first protrusion 86 of the first arm 72 and the projection 124 of an other one of the locking tabs 116 engage the first protrusion 86 of the second arm 74 which rotates the locking tabs 116 about the tab axis T for disengaging the teeth 118 of the locking tabs 116 from the teeth 112 of the first legs 26 while the biasing member 130 is compressed within the cavity 126.

Referring to FIGS. 17-20, a third embodiment of an adjustable steering column assembly 133 for a vehicle, wherein like reference numerals indicate like or corresponding parts throughout the several views, is generally shown. Identical or similar components discussed in the first and second embodiments of the assemblies 20, 111 have the same reference numerals in this embodiment and additional or different components of this embodiment have different reference numerals. The primary distinction between this embodiment of the assembly 133 and the first and second embodiments of the assemblies 20, 111 is the configuration of a first clamping member 134, a second clamping member 136, a second protrusion 138, and a second locking member 140 disposed parallel to the first locking member 78, which will be discussed in detail below.

Figure 19:
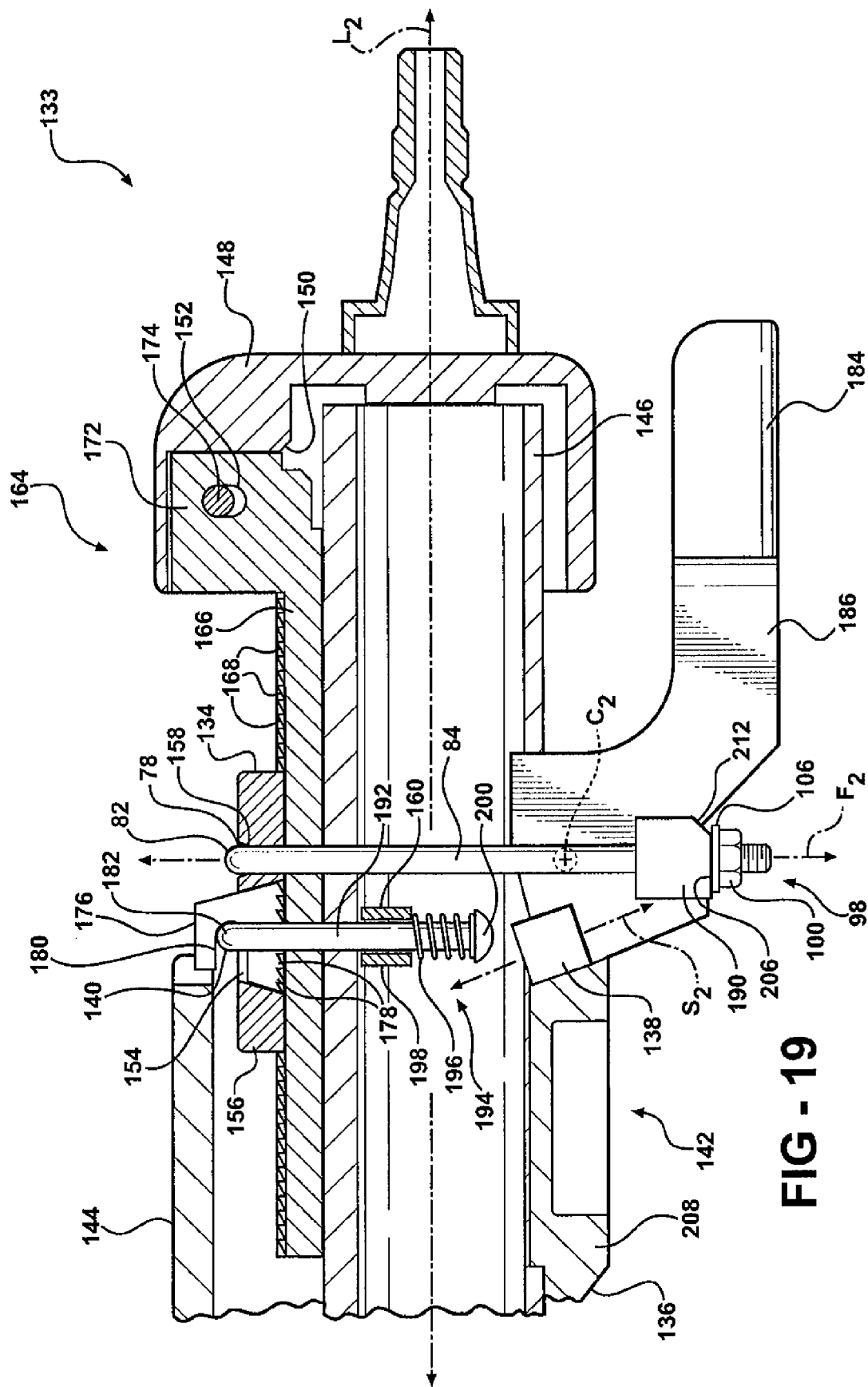
FIG. 19 is a partial cross-sectional view of the adjustable steering column assembly having a second locking member spaced from a second protrusion in a locked position of the third embodiment.
Figure 20:
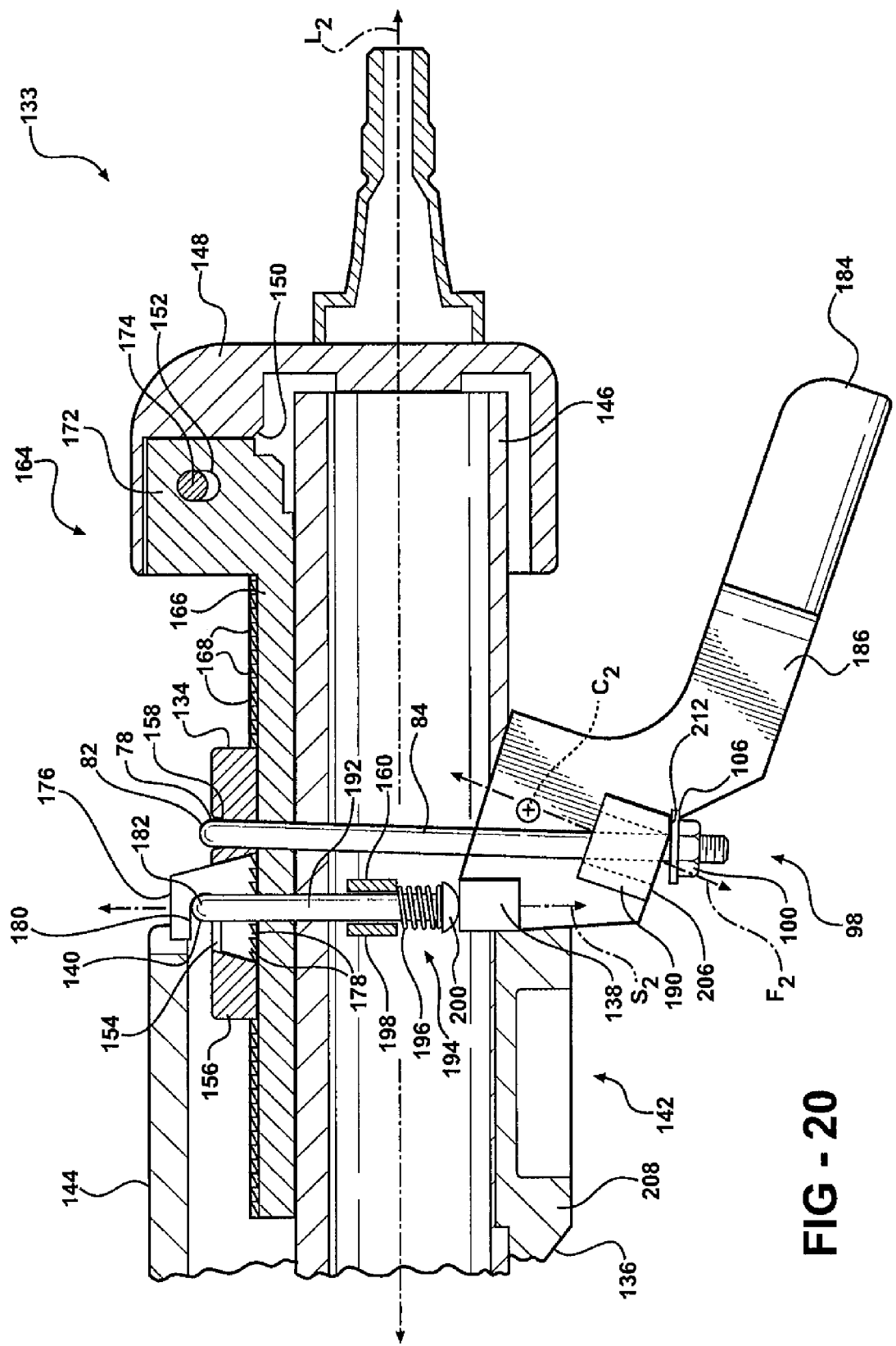
FIG. 20 is a partial cross-sectional view of the adjustable steering column assembly having the second locking member engaging the second protrusion in an unlocked position of the third embodiment.

In this embodiment of the assembly 133, a clamping apparatus, generally indicated at 142, includes the second clamping member 136 integral with a bracket 144 such that the second clamping member 136 is prevented from rotating about the bracket axis B which prevents movement of a column jacket 146 in the tilting direction (raking). Instead, the column jacket 146 also includes a tilt head 148 moveable about a longitudinal axis $L_2$ in the tilting direction with the steering wheel coupled to the tilt head 148 on one end and the column jacket 146 coupled to the tilt head 148 on an other end. In other words, the column jacket 146 moves substantially parallel the longitudinal axis $L_2$ for the telescoping direction and the tilt head 148 moves substantially transverse the longitudinal axis $L_2$ for the tilting direction. It is to be appreciated that the tilt head 148 moves with the column jacket 146 in the telescoping direction due to the tilt head 148 being coupled to the column jacket 146; however, the tilt head 148 moves independently of the column jacket 146 in the tilting direction. As shown in FIGS. 19 and 20, the tilt head 148 defines a chamber 150 for receiving one end of the column jacket 146 and an elongated hollow 152 transverse the longitudinal axis $L_2$. The chamber 150 and the elongated hollow 152 will be discussed further below.

Referring back to FIGS. 17 and 18, the clamping apparatus 142 further includes the first clamping member 134 mounted to the second clamping member 136 and rotatable relative to the second clamping member 136 for selectively allowing and preventing movement of at least one of the column jacket 146 in the telescoping direction and the tilt head 148 in the tilting direction. The first clamping member 134 defining an orifice 154 extending transverse the longitudinal axis $L_2$. More specifically, the orifice 154 is disposed through a first upper portion 156 of the first clamping member 134 and adjacent a first groove 158 of the first upper portion 156. The first clamping member 134 further includes a plurality of first ears 160 spaced from each other with the first ears 160 disposed between the first locking member 78 and the second locking member 140 along the longitudinal axis $L_2$. More specifically, the first ears 160 are mounted to the first upper portion 156 and extend away from each other such that the first ears 160 are spaced from the orifice 154 and the first groove 158. It is to be appreciated that the first ears 160 may be disposed between a plurality of first legs 162 of the bracket 144 and the second locking member 140, the first ears 160 may be coupled to the first locking member 78 and the second locking member 140, or the first ears 160 may be disposed at any other suitable location.

A locking device, generally indicated at 164, includes a tilt bar 166 having a plurality of teeth 168 extending away from the longitudinal axis $L_2$ with the tilt bar 166 coupled to the tilt head 148. The tilt bar 166 is disposed between the column jacket 146 and the first upper portion 156. However it is to be appreciated that the tilt bar 166 may be disposed between the column jacket 146 and a second upper portion 170 of the second clamping member 136. The tilt bar 166 includes a lobe 172 adjacent the teeth 168 and disposed in the chamber 150 of the tilt head 148 with the elongated hollow 152 disposed through the lobe 172. A pin 174 is disposed through the elongated hollow 152 for coupling the tilt bar 166 to the tilt head 148. The pin 174 moves along the elongated hollow 152 as the tilt head 148 rotates in the tilting direction. The elongated hollow 152 allows the tilt head 148 to move transverse the longitudinal axis $L_2$ without causing the tilt bar 166 to also move transverse the longitudinal axis $L_2$. In other words, the tilt head 148 moves transverse to the longitudinal axis $L_2$ while the tilt bar 166 moves along the longitudinal axis $L_2$.

The tilt bar 166 is moveable along at least one of a part of the first clamping member 134 and a part of the second clamping member 136 for selectively allowing and preventing movement of the tilt head 148 in the tilting direction. Meaning, the tilt bar 166 moves along the longitudinal axis $L_2$ in response to movement of the tilt head 148 in the tilting direction. It is to be appreciated that the tilt bar 166 may be moveable along both of the parts of the first and second clamping members 134, 136 or moveable along the part of the first clamping member 134 only. The part of the first clamping member 134 is further defined as the first upper portion 156 and the part of the second clamping member 136 is further defined as the second upper portion 170.

The locking device 164 further includes a locking tab 176 coupled to the second locking member 140 and having a plurality of teeth 178 configured to cooperate with the teeth 168 of the tilt bar 166 for selectively allowing and preventing movement of the tilt head 148 in the tilting direction. The orifice 154 of the first clamping member 134 receives the locking tab 176 such that movement of the second locking member 140 allows the locking tab 176 to move through the orifice 154 to selectively engage and disengage the tilt bar 166. More specifically, the locking tab 176 moves through the orifice 154 toward the tilt bar 166 to engage the teeth 178 of the locking tab 176 with the teeth 168 of the tilt bar 166 to prevent movement of the tilt head 148 in the tilting direction and the locking tab 176 moves through the orifice 154 away from the tilt bar 166 to disengage the teeth 178 of the locking tab 176 with the teeth 168 of the tilt bar 166 to allow movement of the tilt head 148 in the tilting direction.

The locking tab 176 defines a slot 180 spaced from the teeth 178 of the locking tab 176 for receiving the second locking member 140. More specifically, the slot 180 of the locking tab 176 receives a body portion 182 of the second locking member 140 for attaching the locking tab 176 to the second locking member 140 such that movement of the second locking member 140 moves the locking tab 176 through the orifice 154.

In this embodiment of the assembly 133, a lever 184 includes a first arm 186 and a second arm 188 with each of the arms 186, 188 having the second protrusion 138. The orientation of the second protrusion 138 of the arms 186, 188 is different from the first and second embodiments of the assemblies 20, 111 with the second aperture 92 of the protrusion 138 eliminated. Each of the first and second arms 186, 188 include the second protrusion 138 extending outwardly away from each other and spaced from the first protrusion 190 of each of the arms 186, 188 with the second locking member 140 adjacent the second protrusion 138 of each of the arms 186, 188. A first protrusion 190 of each of the arms 186, 188 and the second protrusion 138 are spaced and offset from each other. Each of the first and second arms 186, 188 define a first axis $F_2$ parallel to each other and extending through the first protrusion 190 of each of the arms 186, 188 with the appendages 84 of the first locking member 78 extending along the first axis $F_2$ when the lever 184 in the set position. Each of the first and second arms 186, 188 define a second axis $S_2$ extending substantially parallel to each other and extending through the second protrusion 138 of each of the arms 186, 188 with the second axis $S_2$ disposed at an angle relative to the first axis $F_2$ with a pair of appendages 192 of the second locking member 140 disposed adjacent to the second axis $S_2$ when the lever 184 in the set position. Preferably, the first axis $F_2$ and the second axis $S_2$ are disposed at an angle other than 90 degrees (90°) relative to each other when moving between the locked and unlocked positions.

Rotation of the lever 184 to the adjustment position moves the appendages 84 of the first locking member 78 away from the first axis $F_2$ and the second protrusion 138 of each of the arms 186, 188 engage the appendages 192 of the second locking member 140 to move the second locking member 140 along the second axis $S_2$ for minimizing rotation of the lever 184 when the locking device 164 moves between the locked and unlocked positions. In other words, when the lever 184 moves to the unlocked position, the appendages 84 of the first locking member 78 and the first axis $F_2$ angle away from each other such that the first axis $F_2$ and the appendages 84 of the first locking member 78 cross each other proximal to the first protrusion 190 with the appendages 192 of the second locking member 140 abutting the second protrusion 138 of each of the arms 186, 188 and moving the second locking member 140 upwardly along the second axis $S_2$ for moving the locking tab 176 away from the tilt bar 166.

The first locking member 78 includes the body portion 82 having the pair of appendages 84 spaced from each other with the body portion 82 of the first locking member 78 coupled to the first clamping member 134 and one of the appendages 84 of the first locking member 78 mounted to the first protrusion 190 of the first arm 186 and an other one of the appendages 84 of the first locking member 78 mounted to the first protrusion 190 of the second arm 188. The second locking member 140 also includes the body portion 182 and the appendages 192 spaced from each other. In this embodiment, the second locking member 140 is disposed substantially parallel to the first locking member 78 and disposed about the first clamping member 134 with the first locking member 78 selectively allowing and preventing movement of the column jacket 146 in the telescoping direction and the second locking member 140 selectively allowing and preventing movement of the column jacket 146 in the tilting direction. The second locking member 140 engages the second protrusion 138 of each of the arms 186, 188 instead of mounting to each of the arms 186, 188. In other words, the body portion 182 of the second locking member 140 selectively abuts the first clamping member 134 with one of the appendages 192 of the second locking member 140 extending adjacent the second protrusion 138 of the first arm 186 and an other one of the appendages 192 of the second locking member 140 extending adjacent the second protrusion 138 of the second arm 188. It is to be appreciated that the first length $X_1$ of the body portion 82 of the first locking member 78 may be greater than, less than, or equal to a second length $X_3$ of the body portion 182 of the second locking member 140. It is to also be appreciated that the first locking member 78 may aid in selectively allowing and preventing movement of the column jacket 146 in the tilting direction because the tilt bar 166 is disposed between the first clamping member 134 and the column jacket 146. For example, when the locking device 164 is in the locked position, the first clamping member 134 rotates to clamp the column jacket 146 therebetween which clamps the tilt bar 166 between the first upper portion 156 and the column jacket 146.

Each of the appendages 192 of the second locking member 140 including a biasing member 194 spaced from the body portion 182 of the second locking member 140 and abutting a section of at least one of the bracket 144 and the first clamping member 134 for biasing the second locking member 140 in the locked position when the lever 184 in the set position. More specifically, the biasing member 194 is disposed about the appendages 192 of the second locking member 140 for biasing the locking tab 176 in the locked position. The biasing member 194 may be further defined as a spring 196 disposed about the appendages 192 of the second locking member 140. The bracket 144 may include a plurality of second ears 198 spaced from each other adjacent the first ears 160 for abutting the biasing member 194. The section is further defined as the first ears 160 and/or the second ears 198.

In this embodiment, the fasteners 98 coupled to the appendages 192 of the second locking member 140 are eliminated. Instead, each of the appendages 192 of the second locking member 140 include a foot 200 for selectively engaging and disengaging the second protrusion 138 and for retaining the biasing member 194 about each of the appendages 192 of the second locking member 140. Preferably, the biasing member 194 of each of the appendages 192 of the second locking member 140 is disposed between the foot 200 and the first and second ears 156, 180. However it is to be appreciated that the biasing member 194 may be disposed in other orientations as long as the biasing member 194 biases the locking tab 176 in the locked position.

In this embodiment, the locking device 164 includes the first locking member 78, the second locking member 140, the locking tab 176, the biasing member 194, the tilt bar 166 and the fasteners 98. The clamping apparatus 142 includes the first clamping member 48 and the second clamping member 136. It is to be appreciated that the clamping apparatus 142 may include other components of the assembly 133.

For illustrative purposes only, an example of the locking device 164 moving between the locked and unlocked positions in response to rotation of the lever 184 between the set and adjustable positions is discussed below. Preferably, the lever 184 rotates less than 35 degrees (35°) between the set and adjustable positions when moving the locking device 164 between the locked and unlocked positions, more preferably, the lever 184 rotates less than 11 degrees (11°). Most preferably, the lever 184 rotates 10 degrees (10°) or less between the set and adjustable positions when moving the locking device 164 between the locked and unlocked positions.

Referring to FIG. 19, the locking device 164 is shown in the locked position and the lever 184 is shown in the set position for preventing movement of the column jacket 146 in the telescoping and tilting directions. When the lever 184 is in the set position, the first and second arms 186, 188 abut a plurality of stoppers 204. The fasteners 98 of the first locking member 78 engage a locking surface 206 of the first protrusion 190 of the arms 186, 188. The appendages 84 of the first locking member 78 are disposed along the first axis $F_2$ when the lever 184 is in the set position. The first locking member 78 rotates the first clamping member 134 about a pivot axis $P_2$ such that the first upper portion 156 rotates toward a second lower portion 208 and a first lower portion 210 rotates toward the second upper portion 170 for clamping the column jacket 146 therebetween to prevent movement of the column jacket 146 in the telescoping direction. In addition, rotation of the first upper portion 156 and the first lower portion 210 also clamps the tilt bar 166 between the column jacket 146 the first clamping member 134 for aiding in preventing movement of the tilt head 148 in the tilting direction. In other words, pressure is applied to the first and second clamping members 134, 136, the tilt bar 166 and the column jacket 146 for preventing movement of the column jacket 146. The tilt bar 166, the first upper portion 156 and the column jacket 146 are sandwiched between the first locking member 78 and the second lower portion 208 of the second clamping member 136. The second locking member 140 is disposed adjacent the second axis $S_2$ when the lever 184 is in the set position. The foot 200 of the appendages 192 of the second locking member 140 is spaced from the second protrusion 138 of each of the arms 186, 188 with the spring 196 biasing the appendages 192 of the second locking member 140 toward the second protrusion 138 of the arms 186, 188 such that the body portion 182 of the second locking member 140 moves the teeth 178 of the locking tab 176 in engagement with the teeth 168 of the tilt bar 166 for preventing movement of the tilt head 148 in the tilting direction.

Referring to FIG. 20, the locking device 164 is shown in the unlocked position and the lever 184 is shown in the adjustable position for allowing movement of the column jacket 146 in the telescoping and tilting directions. The lever 184 rotates about a lever axis $C_2$ to the adjustable position and the first and second arms 186, 188 rotate away from the stoppers 204. The fasteners 98 of the first locking member 78 engage an adjusting surface 212 of the first protrusion 190 of the arms 186, 188. The appendages 84 of the first locking member 78 move away from the first axis $F_2$ when the lever 184 is in the adjustable position. In other words, the appendages 84 of the first locking member 78 crosses the first axis $F_2$ proximal to the first protrusion 190. The first locking member 78 relieves the pressure on the first upper portion 156 which allows the first upper portion 156 to rotate away from the second lower portion 208 and the first lower portion 210 to rotate away from the second upper portion 170 for unclamping the column jacket 146 therebetween to allow movement of the column jacket 146 in the telescoping direction. In addition, rotation of the first upper portion 156 and the first lower portion 210 about the pivot axis $P_2$ also unclamps the tilt bar 166 between the column jacket 146 and the first clamping member 134 for aiding in allowing movement of the tilt head 148 in the tilting direction. Changing the radius of the first locking member 78 to the unlocked position relieves pressure on the first and second clamping members 134, 136, the tilt bar 166 and the column jacket 146 for allowing movement of the column jacket 146 in the telescoping and tilting directions. When adjusting the column jacket 146 in the telescoping direction, the column jacket 146, the tilt head 148, and the tilt bar 166 move along the longitudinal axis $L_2$. In other words, the column jacket 146 moves along the first and second clamping members 134, 136 and the tilt bar 166 moves along the first clamping member 134. The second locking member 140 is disposed along the second axis $S_2$ when the lever 184 is in the adjustable position. The foot 200 of the appendages 192 of the second locking member 140 engage the second protrusion 138 of each of the arms 186, 188 with the spring 196 compressed between the foot 200 and the first and second ears 156, 180 such that the body portion 182 of the second locking member 140 moves away from the first upper portion 156 of the first clamping member 134. As the body portion 182 of the second locking member 140 moves away from the first clamping member 134, the locking tab 176 moves through the orifice 154 away from the tilt bar 166 and the teeth 178 of the locking tab 176 disengage from the teeth 168 of the tilt bar 166 for allowing movement of tilt head 148 in the tilting direction. When adjusting the tilt head 148 in the tilting direction, the tilt bar 166 moves along the longitudinal axis $L_2$ and the tilt head 148 moves transverse the longitudinal axis $L_2$.

Figure 21:
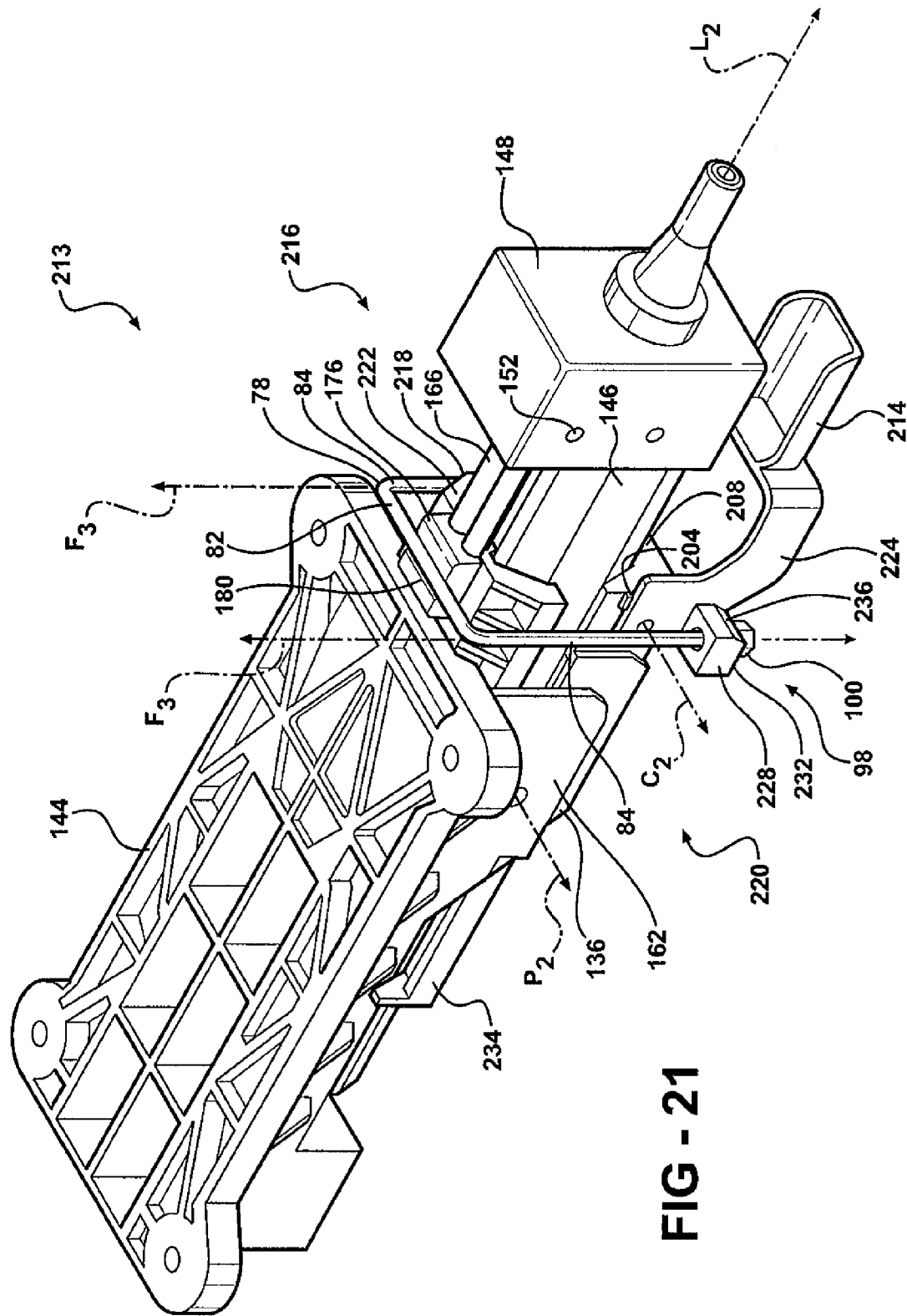
FIG. 21 is a perspective view of an adjustable steering column assembly of a fourth embodiment.
Figure 22:
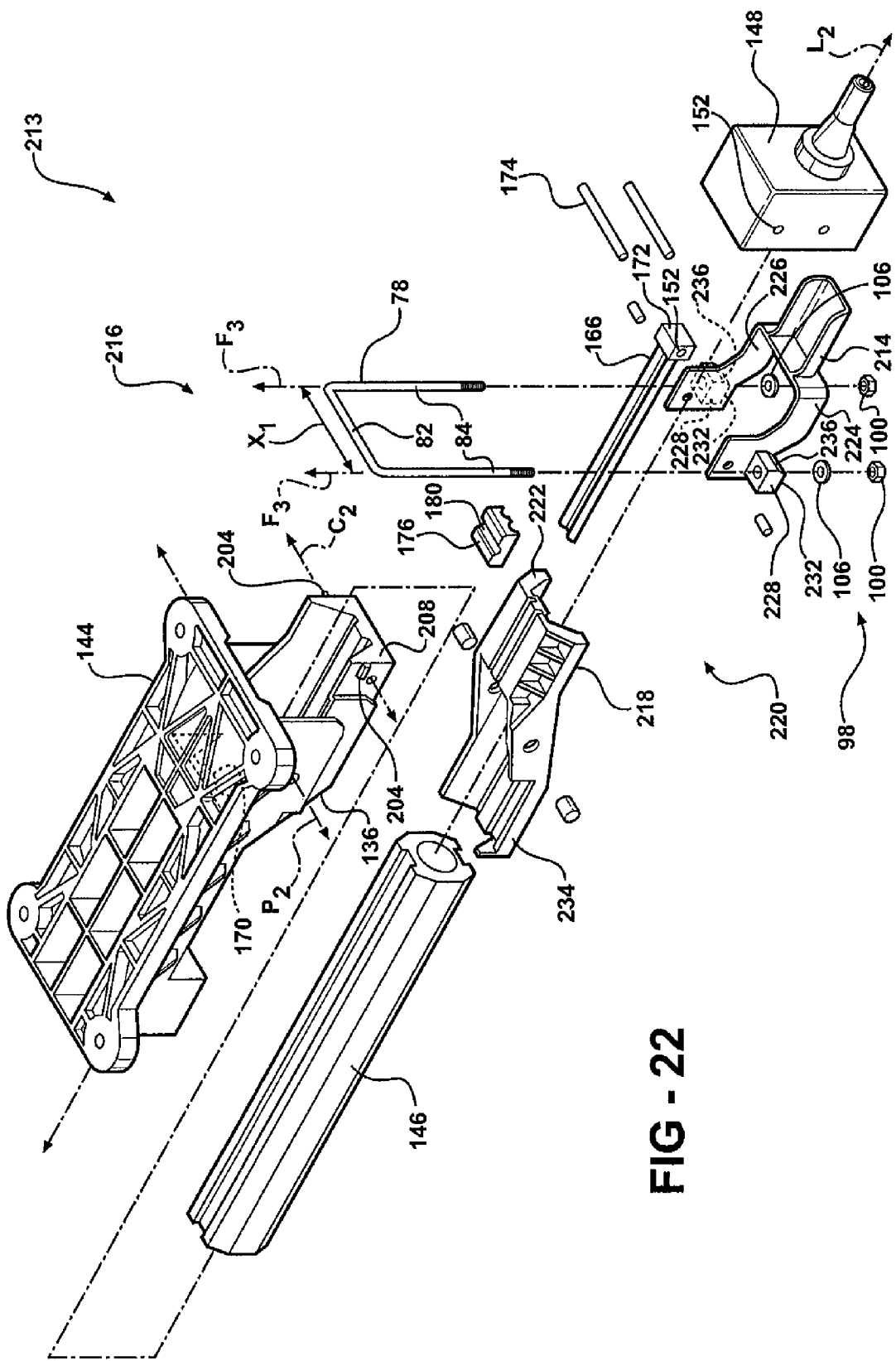
FIG. 22 is an exploded view of the adjustable steering column assembly of the fourth embodiment.

Referring to FIGS. 21 and 22, a fourth embodiment of the adjustable steering column assembly 213 for a vehicle, wherein like reference numerals indicate like or corresponding parts throughout the several views, is generally shown. Identical or similar components discussed in the first, second, and third embodiments of the assemblies 20, 111, 133 have the same reference numerals in this embodiment and additional or different components of this embodiment have different reference numerals. The primary distinction between this embodiment of the assembly 213 and the first, second, and third embodiments of the assemblies 20, 111, 133 is the configuration of a lever 214 with the second locking member 80 and the second protrusion 90 eliminated. By eliminating the second locking member 80 and the second protrusion 90 of each of the arms 224, 226, the first locking member 78 is utilized for selectively allowing and preventing movement of the column jacket 146 in at least one of the telescoping direction and the tilting direction, more specifically, for allowing and preventing movement of the column jacket 146 in both the telescoping and tilting directions.

In this embodiment of the assembly 213, a clamping apparatus, generally indicated at 216, includes a first clamping member 218 without the first groove 66 of the first and second embodiments of the assemblies 20, 111 and without the orifice 154 of the third embodiment of the assembly 133. The clamping apparatus 216 further includes the second clamping member 136 integral with the bracket 144 such that the second clamping member 136 is prevented from rotating about the bracket axis B which prevents movement of the column jacket 146 in the tilting direction (raking), as similarly discussed in the third embodiment of the assembly 133. The column jacket 146 also includes the tilt head 148 as similarly discussed in the third embodiment of the assembly 133 for providing movement in the tilting direction.

A locking device, generally indicated at 220, in this embodiment includes the locking tab 176 and the tilt bar 166 of the third embodiment of the assembly 133 without the teeth 168 of the tilt bar 166 and without the teeth 178 of the locking tab 176. Instead, the tilt bar 166 and the locking tab 176 are configured to cooperate with each other such that the locking tab 176 engages the tilt bar 166 for preventing movement of the column jacket 146 in the telescoping direction and the tilt head 148 in the tilting direction. The tilt bar 166 is coupled to the tilt head 148 and moveable along at least one of the part of the first clamping member 218 and the part of the second clamping member 136 for selectively allowing and preventing movement of the tilt head 148 in the tilting direction, as similarly discussed in the third embodiment of the assembly 133. The tilt bar 166 is disposed between the locking tab 176 and a first upper portion 222 of the first clamping member 218. The locking tab 176 is disposed between the first locking member 78 and the tilt bar 166 for selectively allowing and preventing movement of the tilt head 148 in the tilting direction with the slot 180 of the locking tab 176 opposing the tilt bar 166.

The lever 214 includes a first arm 224 and a second arm 226 with each of the arms 224, 226 having a first protrusion 228. The first locking member 78 includes the body portion 82 and the appendages 84 spaced from each other with one of the appendages 84 mounted to the first protrusion 228 of the first arm 224 and an other one of the appendages 84 mounted to the first protrusion 228 of the second arm 226, as similarly discussed in all of the previous embodiments of the assemblies 20, 111, 133. The body portion 82 of the first locking member 78 is coupled to the locking tab 176 such that rotation of the lever 214 to the set position allows the first locking member 78 to prevent movement of the column jacket 146 in the telescoping direction and the tilting direction. More specifically, the slot 180 of the locking tab 176 receives the body portion 82 of the first locking member 78 for attaching the locking tab 176 to the first locking member 78 such that movement of the first locking member 78 moves the locking tab 176 toward and away from the tilt bar 166.

Each of the first and second arms 224, 226 of the lever 214 define a first axis $F_3$ parallel to each other and extending through the first protrusion 228 of each of the arms 224, 226 as similarly discussed in all of the previous embodiments of the assembly 20, 111, 133. The appendages 84 of the first locking member 78 extending along the first axis $F_3$ when the lever 214 in the set position and the appendages 84 of the first locking member 78 move away from the first axis $F_3$ when the lever 214 in the adjustable position for minimizing rotation of the lever 214 between the set and adjustable positions when the locking device 76 moves between the locked and unlocked positions. In other words, the appendages 84 of the first locking member 78 and the first axis $F_3$ angle away from each other when in the unlocked position such that the first axis $F_3$ and the appendages 84 of the first locking member 78 cross each other proximal to the first protrusion 228.

In this embodiment, the locking device 220 includes the first locking member 78, the locking tab 176, the tilt bar 166 and the fasteners 98. The clamping apparatus 216 includes the first clamping member 218 and the second clamping member 136. It is to be appreciated that the clamping apparatus 216 may include other components of the assembly 213.

For illustrative purposes only, an example of the locking device 220 moving between the locked and unlocked positions and the lever 214 moving between the set and adjustable positions is discussed below. Preferably, the lever 214 rotates less than 35 degrees (35°) between the set and adjustable positions when moving the locking device 220 between the locked and unlocked positions, more preferably, the lever 214 rotates less than 11 degrees (11°). In other words, the lever 214 rotates 10 degrees (10°) or less between the set and adjustable positions when moving the locking device 220 between the locked and unlocked positions.

When the lever 214 is in the set position, the locking device 220 is in the locked position for preventing movement of the column jacket 146 in the telescoping and tilting directions. When the lever 214 is in the set position, the first and second arms 224, 226 abut the stoppers 204. The fasteners 98 of the first locking member 78 engage a locking surface 232 of the first protrusion 228 of the arms 224, 226. The appendages 84 of the first locking member 78 are disposed along the first axis $F_3$ when the lever 214 is in the set position. The locking tab 176 engages the tilt bar 166 and the tilt bar 166 engages the first upper portion 222 of the first clamping member 218 such that the tilt bar 166 is clamped between the locking tab 176 and the first upper portion 222 for preventing movement of the tilt head 148 in the tilting direction. The first locking member 78 rotates the first clamping member 218 about a pivot axis $P_2$ such that the tilt bar 166 engages the first upper portion 222 and rotates the first upper portion 222 toward the second lower portion 208 and a first lower portion 234 toward the second upper portion 170 for clamping the column jacket 146 therebetween to prevent movement of the column jacket 146 in the telescoping direction. Pressure is applied to the first clamping member 218, the second clamping member 136, the tilt bar 166, the locking tab 176 and the column jacket 146 for preventing movement of the column jacket 146 in the telescoping and tilting directions. In other words, the locking tab 176, the tilt bar 166, the first upper portion 222, and the column jacket 146 are sandwiched between the first locking member 78 and the second lower portion 208 of the second clamping member 136.

When the lever 214 is in the adjustable position, the locking device 220 is in the unlocked position for allowing movement of the column jacket 146 in the telescoping and tilting directions. The lever 214 rotates about the lever axis $C_2$ to the adjustable position and the first and second arms 224, 226 rotate away from the stoppers 204. The fasteners 98 of the first locking member 78 engage an adjusting surface 236 of the first protrusion 228 of the arms 224, 226. The appendages 84 of the first locking member 78 move away from the first axis $F_3$ when the lever 214 is in the adjustable position such that the appendages 84 of the first locking member 78 crosses the first axis $F_3$ proximal to the first protrusion 228. The first locking member 78 rotates the first upper portion 222 away from the second lower portion 208 and the first lower portion 234 away from the second upper portion 170 for unclamping the column jacket 146 therebetween to allow movement of the column jacket 146 in the telescoping direction. In other words, the first locking member 78 relieves the pressure on the first upper portion 222 which allows the first upper portion 222 to rotate away from the second lower portion 208 and the first lower portion 234 to rotate away from the second upper portion 170 for unclamping the column jacket 146 therebetween for allowing movement of the column jacket 146 in the telescoping direction. In addition, rotation of the first clamping member 218 also unclamps the tilt bar 166 between the first upper portion 222 and the locking tab 176 for allowing movement of the tilt head 148 in the tilting direction. Changing the radius of the first locking member 78 to the unlocked position relieves pressure on the first clamping member 218, the second clamping member 136, the tilt bar 166, the locking tab 176 and the column jacket 146 for allowing movement of the column jacket 146 in the telescoping and tilting directions. When adjusting the column jacket 146 in the telescoping direction, the column jacket 146, the tilt head 148 and the tilt bar 166 move along a longitudinal axis $L_2$. In other words, the column jacket 146 moves along the first clamping member 218 and the second clamping member 136 while the tilt bar 166 moves along at least the first clamping member 218. When adjusting the tilt head 148 in the tilting direction, the tilt bar 166 moves along the longitudinal axis $L_2$ and the tilt head 148 moves transverse the longitudinal axis $L_2$.

Figure 23:
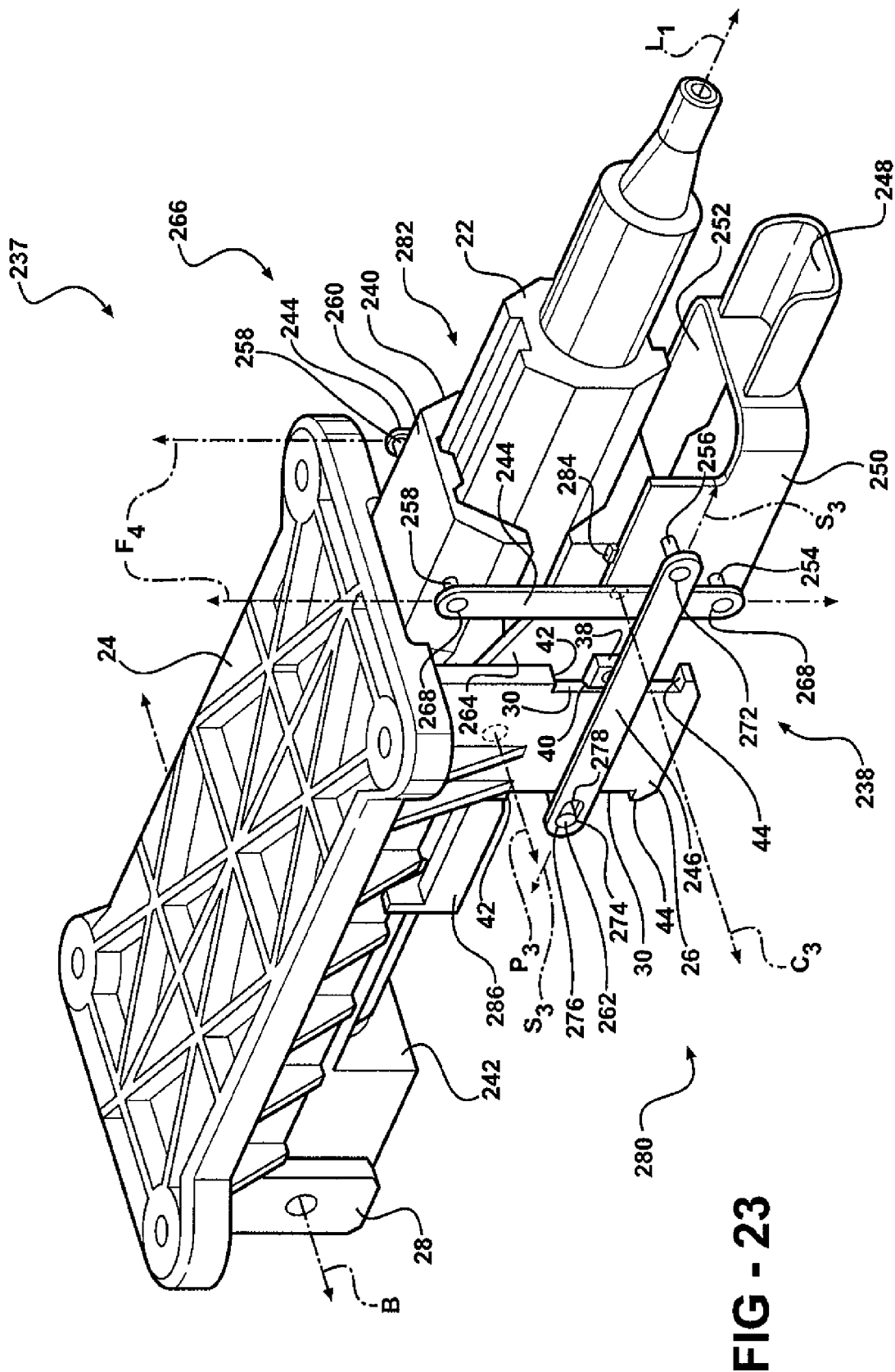
FIG. 23 is a perspective view of an adjustable steering column assembly of a fifth embodiment.
Figure 24:
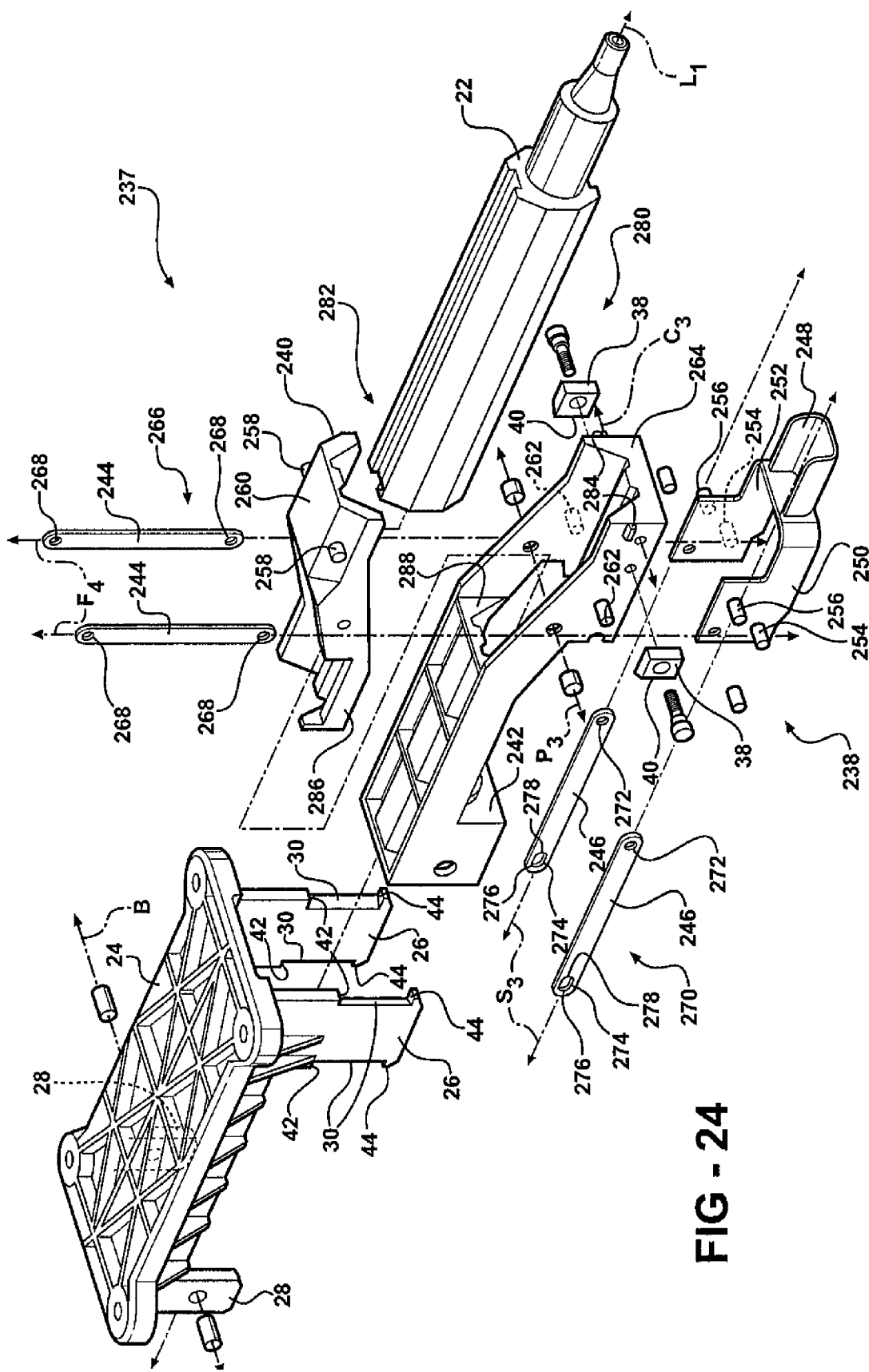
FIG. 24 is an exploded view of the adjustable steering column assembly of the fifth embodiment.

Referring to FIGS. 23 and 24, a fifth embodiment of the adjustable steering column assembly 237 for a vehicle, wherein like reference numerals indicate like or corresponding parts throughout the several views, is generally shown. Identical or similar components discussed in the first, second, third, and fourth embodiments of the assemblies 20, 111, 133, 213 have the same reference numerals in this embodiment and additional or different components of this embodiment have different reference numerals. The primary distinction between this embodiment of the assembly 237 and the first, second, third, and fourth embodiments of the assemblies 20, 111, 133, 213 is the configuration of a locking device, generally indicated at 238, a first clamping member 240, a second clamping member 242 and the configuration of at least one first locking member 244, at least one second locking member 246 and a lever 248.

In this embodiment of the assembly 237 and as similarly discussed in the first and second embodiments of the assemblies 20, 111, the second clamping member 242 is rotatable about the bracket axis B for tilting the column jacket 22, which is commonly known to those of ordinary skill in the art as raking. In other words, the second clamping member 242 is a separate and distinct component from the bracket 24. Therefore, in this embodiment, the tilt head 148 and tilt bar 166 are eliminated.

The lever 248 includes a first arm 250 and a second arm 252 each define a first axis $F_4$ and a second axis $S_3$. The first and second axes $F_4$, $S_3$ are similar to those discussed in the first and second embodiments of the assemblies 20, 111. Each of the first and second arms 250, 252 include a first protrusion 254 extending outwardly away from each other without the first aperture 88 of the previous embodiments of the assemblies 20, 111, 133, 213. In other words, the first aperture 88 is eliminated in this embodiment. The first protrusion 254 of each of the arms 250, 252 is disposed through the respective first axis $F_4$ of each of the arms 250, 252. Each of the first and second arms 250, 252 further include a second protrusion 256 extending outwardly away from each other and spaced from the first protrusion 254 without the second aperture 92 of the first and second embodiments of the assemblies 20, 111. In other words, the second aperture 92 of the arms 250, 252 is eliminated in this embodiment. The second protrusion 256 of each of the arms 250, 252 is disposed through the second axis $S_3$ of each of the arms 250, 252.

The first clamping member 240 includes a plurality of first extensions 258 spaced from each other with one of the first extensions 258 disposed substantially parallel to the first protrusion 254 of the first arm 250 and an other one of the first extensions 258 disposed substantially parallel to the first protrusion 254 of the second arm 252 when the lever 248 is in the set position. More specifically, a first upper portion 260 of the first clamping member 240 includes the first extensions 258 extending away from each other.

The second clamping member 242 includes a plurality of second extensions 262 spaced from each other with one of the second extensions 262 disposed substantially parallel to the second protrusion 256 of the first arm 250 and an other one of the second extensions 262 disposed substantially parallel to the second protrusion 256 of the second arm 252 when the lever 248 is in the set position. More specifically, a second lower portion 264 of the second clamping member 242 includes the second extensions 262 extending away from each other. The first legs 26 of the bracket 24 are disposed between the second extensions 262 of the second lower portion 264 and the second protrusion 256 of each of the arms 250, 252.

A portion of the locking device 238 is mounted to the first extensions 258 and an other portion of the locking device 238 is mounted to the second extensions 262 such that movement of the locking device 238 to the locked position allows the portion of the locking device 238 to rotate the first clamping member 240 to clamp the column jacket 22 therebetween for preventing movement of the column jacket 22 in the telescoping direction while allowing the other portion of the locking device 238 to engage the second clamping member 242 for preventing movement of the column jacket 22 in the tilting direction.

The at least one first locking member 244 is further defined as a plurality of first locking members, generally indicated at 266, with one of the first locking members 266 mounted to one of the first extensions 258 and the first protrusion 254 of the first arm 250 and an other one of the first locking members 266 mounted to an other one of the first extensions 258 and the first protrusion 254 of the second arm 252 such that movement of the lever 248 in the set position allows the first locking members 266 to extend along the first axis $F_4$ for preventing movement of the column jacket 22 in the telescoping direction. Each of the first locking members 266 define a plurality of first holes 268 spaced from each other for receiving the first extensions 258 of the first clamping member 240 and the first protrusion 254 of each of the arms 250, 252.

The at least one second locking member 246 is further defined as a plurality of second locking members, generally indicated at 270, with one of the second locking members 270 mounted to one of the second extensions 262 and the second protrusion 256 of the first arm 250 and an other one of the second locking members 270 mounted to an other one of the second extensions 262 and the second protrusion 256 of the second arm 252 such that movement of the lever 248 in the set position allows the second locking members 270 to extend along the second axis $S_3$ for preventing movement of the column jacket 22 in the tilting direction. The second locking members 270 are disposed about the first legs 26 of the bracket 24 with each of the second locking members 270 defining a second hole 272 and an elongated hole 274 spaced from each other for receiving the second extensions 262 of the second clamping member 242 and the second protrusion 256 of each of the arms 250, 252. The elongated hole 274 of the second locking members 270 extends substantially parallel a longitudinal axis $L_1$ when in the set position and includes a first end 276 and a second end 278 spaced from each other for allowing the second extensions 262 to move along the elongated hole 274 between the first and second ends 276, 278.

The portion of the locking device 238 is further defined as the plurality of first locking members 266 mounted to the first and second arms 250, 252 and disposed about both of the first and second clamping members 240, 242 for selectively allowing and preventing movement of the column jacket 22 in at least one of the telescoping direction and the tilting direction. The other portion of the locking device 238 is further defined as the plurality of second locking members 270 mounted to the first and second arms 250, 252 and disposed about the second clamping member 242 and the first legs 26.

In this embodiment, the locking device 238 includes the first and second locking members 244, 246, more specifically the plurality of first and second locking members 266, 270. A lever locking mechanism, generally indicated at 280, includes the first clamping member 240, the second clamping member 242, the locking device 238 and the lever 248. A clamping apparatus, generally indicated at 282, includes the first clamping member 240 and the second clamping member 242. It is to be appreciated that the clamping apparatus 282 may include other components of the assembly 237.

For illustrative purposes only, an example of the locking device 238 moving between the locked and unlocked positions in response to rotation of the lever 248 between the set and adjustable positions is discussed below. Preferably, the lever 248 rotates less than 35 degrees (35°) between the set and adjustable positions when moving the locking device 238 between the locked and unlocked positions, more preferably, the lever 248 rotates less than 11 degrees (11°). Most preferably, the lever 248 rotates 10 degrees (10°) or less between the set and adjustable positions when moving the locking device 238 between the locked and unlocked positions.

When the lever 248 is in the set position, the locking device 238 is in the locked position for preventing movement of the column jacket 22 in the telescoping and tilting directions. When the lever 248 is in the set position, the first and second arms 250, 252 abut a plurality of stoppers 284. The first locking members 266 are disposed along the first axis $F_4$ when the lever 248 is in the set position. Pressure is applied to the first extensions 258 and the first protrusion 254 of each of the arms 250, 252 which causes the first upper portion 260 of the first clamping member 240 to engage the column jacket 22. Meaning, the first locking members 266 rotates the first clamping member 240 about a pivot axis $P_3$ such that the first upper portion 260 rotates toward the second lower portion 264 and a first lower portion 286 rotates toward a second upper portion 288 for clamping the column jacket 22 therebetween to prevent movement of the column jacket 22 in the telescoping direction. The column jacket 22 is sandwiched between the first clamping member 240 and the second clamping member 242. The second locking members 270 are disposed along the second axis $S_3$ when the lever 248 is in the set position. The second extensions 262 move along the elongated hole 274 of each of the first locking members 266 and abuts the first end 276 of the elongated hole 274 when the lever 248 is in the set position for preventing movement of the column jacket 22 in the tilting direction. In other words, pressure is applied to the first legs 26, the second wedges 38, the second extensions 262 and the second protrusion 256 of each of the arms 250, 252 for preventing movement of the column jacket 22 in the tilting direction.

When the lever 248 is in the adjustable position, the locking device 238 is in the unlocked position for allowing movement of the column jacket 22 in the telescoping and tilting directions. The lever 248 rotates about a lever axis $C_3$ to the adjustable position and the first and second arms 250, 252 rotate away from the stoppers 284. The first and second locking members 266, 270 move away from the first and second axes $F_4$, $S_3$, respectively when the lever 248 is in the adjustable position such that the first locking members 266 crosses the first axis $F_4$ proximal the first protrusion 254 and the second locking members 270 crosses the second axis $S_3$ proximal the second protrusion 256. The first locking members 266 relieves the pressure on the first upper portion 260 which allows the first upper portion 260 to rotate away from the second lower portion 264 and the first lower portion 286 to rotate away from the second upper portion 288 for unclamping the column jacket 22 therebetween to allow movement of the column jacket 22 in the telescoping direction. In other words, changing the radius of the first locking members 266 to the unlocked position relieves pressure on the first extensions 258, the first protrusion 254 of each of the arms 250, 252, and the first and second clamping members 240, 242 for allowing movement of the column jacket 22 in the telescoping direction. When adjusting the column jacket 22 in the telescoping direction, the column jacket 22 moves along the longitudinal axis $L_1$. In other words, the column jacket 22 moves along the first and second clamping members 240, 242. In addition, the second extensions 262 move along the elongated hole 274 toward the second end 278 for allowing movement of the column jacket 22 in the tilting direction. Changing the radius of the second locking members 270 to the unlocked position relieves pressure on the first legs 26, the second extensions 262, the second protrusion 256 of each of the arms 250, 252 and the second wedges 38 for allowing movement of the column jacket 22 in the tilting direction. When adjusting the column jacket 22 in the tilting direction, the first and second clamping members 240, 242, the column jacket 22, the lever 248 and the first and second locking members 266, 270 move transverse the longitudinal axis $L_1$.

For the first, second, third and fifth embodiments of the assemblies 20, 111, 133, 237 discussed above, it is to be appreciated that the first locking member 78, 244, 266 and the second locking member 80, 140, 246, 270 may be utilized together or utilized individually. Meaning, if the column jacket 22, 146 only moves in the telescoping direction, then only the locking member 78, 244, 266 for selectively allowing and preventing movement in the telescoping direction is utilized. Likewise, if the column jacket 22, 146 only moves in the tilting direction, then only the locking member 78, 80, 140, 246, 270 for selectively allowing and preventing movement in the tilting direction is utilized. It is to be further appreciated that the fasteners 98 and the locking and adjusting surfaces 94, 96 of the first and second protrusions 86, 90 as discussed in the first embodiment of the assembly 20 may be utilized for any of the first, second, third, and fourth embodiments of the assemblies 20, 111, 133, 213.

In addition, the components of the assemblies 20, 111, 133, 213, 237 discussed above are designed for reducing tolerance requirements thus reducing manufacturing costs. Further, any of the embodiments of the assemblies 20, 111, 133, 213, 237 discussed above may include an energy absorbing device coupled to the bracket 24, 144 for absorbing energy in a vehicle collision. There are many known energy absorbing devices known in the art suitable for use with the adjustable steering column assemblies 20, 111, 133, 213, 237 of the present invention.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. An adjustable steering column assembly for a vehicle, said assembly comprising:
    a column jacket defining a longitudinal axis and moveable in at least one of a telescoping direction and a tilting direction;
    a first clamping member disposed along said longitudinal axis about said column jacket;
    a second clamping member disposed along said longitudinal axis adjacent said first clamping member about said column jacket;
    a lever coupled to at least one of said first and second clamping members and rotatable between a set position for preventing movement of said column jacket in at least one of said telescoping direction and said tilting direction and an adjustable position for allowing movement of said column jacket in at least one of said telescoping direction and said tilting direction;
    a locking device coupled to said lever and at least one of said first and second clamping members and moveable between a locked position and an unlocked position during rotation of said lever between said set and adjustable positions, respectively;
    said lever including a first arm and a second arm flanking said column jacket and coupled to at least one of said first and second clamping members with a portion of said locking device disposed about at least one of said first and second clamping members and engaging both of said first and second arms and at least one of said first and second clamping members such that rotation of said lever moves said portion of said locking device for minimizing rotation of said lever between said set and adjustable positions when said locking device moves between said locked and unlocked positions, wherein said lever rotates less than 35 degrees between said set and adjustable positions when moving said locking device between said locked and unlocked positions, wherein said first and second arms flank said first and second clamping members with said first and second arms mounted to said second clamping member and spaced from said first clamping member; and
    wherein said portion of said locking device is further defined as at least one first locking member mounted to said first and second arms and disposed about both of said first and second clamping members for selectively allowing and preventing movement of said column jacket in at least one of said telescoping direction and said tilting direction.

2. An assembly as set forth in claim 1 wherein each of said first and second arms include a first protrusion extending outwardly away from each other with said first locking member mounted to said first protrusion of each of said arms.

3. An assembly as set forth in claim 2 wherein said locking device includes a second locking member disposed substantially parallel to said first locking member and disposed about said first clamping member with said first locking member selectively allowing and preventing movement of said column jacket in said telescoping direction and said second locking member selectively allowing and preventing movement of said column jacket in said tilting direction.

4. An assembly as set forth in claim 3 wherein each of said first and second arms include a second protrusion extending outwardly away from each other and spaced from said first protrusion of each of said arms with said second locking member adjacent said second protrusion of each of said arms.

5. An assembly as set forth in claim 4 wherein said first and second locking members each include a body portion having a pair of appendages spaced from each other with said body portion of said first locking member coupled to said first clamping member and one of said appendages of said first locking member mounted to said first protrusion of said first arm and an other one of said appendages of said first locking member mounted to said first protrusion of said second arm with said body portion of said second locking member adjacent said first clamping member and one of said appendages of said second locking member extending adjacent said second protrusion of said first arm and an other one of said appendages of said second locking member extending adjacent said second protrusion of said second arm.

6. An assembly as set forth in claim 5 wherein each of said first and second arms define a first axis extending substantially parallel to each other and extending through said first protrusion of each of said arms with said appendages of said first locking member extending along said first axis when said lever is in said set position.

7. An assembly as set forth in claim 6 wherein each of said first and second arms define a second axis extending substantially parallel to each other and extending through said second protrusion of each of said arms with said second axis disposed at an angle relative to said first axis with said appendages of said second locking member disposed adjacent to said second axis when said lever is in said set position such that rotation of said lever to said adjustment position moves said appendages of said first locking member away from said first axis and said second protrusion of each of said arms engage said appendages of said second locking member to move said second locking member along said second axis for minimizing rotation of said lever when said locking device moves between said locked and unlocked positions.

8. An assembly as set forth in claim 5 further including a bracket and each of said appendages of said second locking member including a biasing member spaced from said body portion of said second locking member and abutting a section of at least one of said bracket and said first clamping member for biasing said second locking member in said locked position when said lever is in said set position.

9. An assembly as set forth in claim 3 wherein said column jacket includes a tilt head moveable in said tilting direction and said locking device includes a tilt bar having a plurality of teeth extending away from said longitudinal axis with said tilt bar coupled to said tilt head and moveable along at least one of a part of said first clamping member and a part of said second clamping member for selectively allowing and preventing movement of said tilt head in said tilting direction.

10. An assembly as set forth in claim 9 wherein said locking device includes a locking tab coupled to said second locking member and having a plurality of teeth configured to cooperate with said teeth of said tilt bar for selectively allowing and preventing movement of said tilt head in said tilting direction.

11. An assembly as set forth in claim 10 wherein said first clamping member defines an orifice extending transverse said longitudinal axis for receiving said locking tab such that movement of said second locking member allows said locking tab to move through said orifice to selectively engage and disengage said tilt bar.

12. An assembly as set forth in claim 2 wherein said column jacket includes a tilt head moveable in said tilting direction and said locking device including a tilt bar coupled to said tilt head and moveable along at least one of a part of said first clamping member and a part of said second clamping member for selectively allowing and preventing movement of said tilt head in said tilting direction.

13. An assembly as set forth in claim 12 wherein said locking device includes a locking tab disposed between said first locking member and said tilt bar for selectively allowing and preventing movement of said tilt head in said tilting direction.

14. An assembly as set forth in claim 13 wherein said first locking member includes a body portion having a pair of appendages spaced from each other with said body portion coupled to said locking tab and one of said appendages mounted to said first protrusion of said first arm and an other one of said appendages mounted to said first protrusion of said second arm such that rotation of said lever to said set position allows said first locking member to prevent movement of said column jacket in said telescoping direction and said tilting direction.

15. An assembly as set forth in claim 14 wherein each of said first and second arms define a first axis extending substantially parallel to each other and extending through said first protrusion of each of said arms with said appendages of said first locking member extending along said first axis when said lever is in said set position and said appendages of said first locking member rotates away from said first axis when said lever is in said adjustable position for minimizing rotation of said lever between said set and adjustable positions when said locking device moves between said locked and unlocked positions.

16. A lever locking mechanism for an adjustable steering column having a column jacket defining a longitudinal axis with the column jacket moveable in at least one of a telescoping direction and a tilting direction, said mechanism comprising:
a first clamping member adapted to be disposed along the longitudinal axis about the column jacket;
a second clamping member disposed adjacent said first clamping member and adapted to be disposed along the longitudinal axis about the column jacket;
a lever coupled to at least one of said first and second clamping members with said lever rotatable between a set position for preventing movement of the column jacket in at least one of the telescoping direction and the tilting direction and an adjustable position for allowing movement of the column jacket in at least one of the telescoping direction and the tilting direction;
a locking device having at least one first locking member mounted to said lever and at least one second locking member disposed adjacent said first locking member and mounted to said lever with said locking members moveable between a locked position and an unlocked position during rotation of said lever between said set and adjustable positions, respectively; and
said lever including a first arm and a second arm each defining a first axis extending substantially parallel to each other with said first locking member at least partially disposed along said first axis when said lever is in said set position and each of said first and second arms defining a second axis extending substantially parallel to each other with said second axis disposed at an angle relative to said first axis with said second locking member at least partially disposed along said second axis when said lever is in said set position such that rotation of said lever to said adjustment position moves said first locking member away from said first axis and said second locking member away from said second axis for minimizing rotation of said lever when said locking device moves between said locked and unlocked positions.

17. A mechanism as set forth in claim 16 wherein said lever rotates less than 35 degrees between said set and adjustable positions when moving said locking device between said locked and unlocked positions.

18. A mechanism as set forth in claim 17 wherein said lever rotates less than 11 degrees between said set and adjustable positions when moving said locking device between said locked and unlocked positions.

19. A mechanism as set forth in claim 17 wherein each of said first and second arms include a first protrusion extending outwardly away from each other with said first locking member mounted to said first protrusion of each of said arms.

20. A mechanism as set forth in claim 19 wherein each of said first and second arms include a second protrusion extending outwardly away from each other and spaced from said first protrusion of each of said arms with said second locking member mounted to said second protrusion of each of said arms.

21. A mechanism as set forth in claim 20 wherein said first and second locking members each include a body portion having a pair of appendages spaced from each other with said body portion of said first locking member coupled to said first clamping member and said appendages of said first locking member mounted to said first protrusion of each of said arms with said body portion of said second locking member coupled to said second clamping member and said appendages of said second locking member mounted to said second protrusion of each of said arms such that said locking device moves between said locked and unlocked positions without said first locking member interfering with said second locking member for minimizing rotation of said lever between said set and adjustable positions.

22. A mechanism as set forth in claim 21 wherein said body portion of said first locking member defines a first length and said body portion of said second locking member defines a second length with said first length less than said second length for preventing said first and second locking members from interfering with each other when moving between said locked and unlocked positions.

23. A mechanism as set forth in claim 21 wherein said first protrusion of each of said arms defines a first aperture disposed along said first axis with one of said appendages of said first locking member disposed through said first aperture of said first arm and an other one of said appendages of said first locking member disposed through said first aperture of said second arm for mounting said first locking member to said arms.

24. A mechanism as set forth in claim 23 wherein said second protrusion of each of said arms defines a second aperture disposed along said second axis with one of said appendages of said second locking member disposed through said second aperture of said first arm and an other one of said appendages of said second locking member disposed through said second aperture of said second arm for mounting said second locking member to said arms.

25. A mechanism as set forth in claim 20 further including a bracket having a plurality of first legs disposed substantially parallel to each other with said second clamping member coupled to said bracket and moveable relative to said bracket in the tilting direction with said second locking member disposed about said first legs for selectively allowing and preventing movement of the column jacket in the tilting direction.

26. A mechanism as set forth in claim 25 wherein each of said first legs include a plurality of teeth and said locking device includes a plurality of locking tabs coupled to said second clamping member and having a plurality of teeth configured to cooperate with said teeth of said first legs for selectively allowing and preventing movement of the column jacket in the tilting direction.

27. A mechanism as set forth in claim 26 wherein each of said locking tabs include a projection spaced from said teeth of said locking tabs such that rotation of said lever to said adjustable position allows said first protrusion of said first of said second arm to engage said projection of an other one of said locking tabs for rotating said locking tabs to disengage said teeth from said teeth of said first legs.

28. A mechanism as set forth in claim 20 wherein said first clamping member includes a plurality of first extensions spaced from each other with one of said first extensions disposed substantially parallel to said first protrusion of said first arm and an other one of said first extensions disposed substantially parallel to said first protrusion of said second arm when said lever is in said set position.

29. A mechanism as set forth in claim 28 wherein said at least one first locking member is further defined as a plurality of first locking members with one of said first locking members mounted to one of said first extensions and said first protrusion of said first arm and an other one of said first locking members mounted to an other one of said first extensions and said first protrusion of said second arm such that movement of said lever in said set position allows said first locking members to extend along said first axis for preventing movement of the column jacket in the telescoping direction.

30. A mechanism as set forth in claim 29 wherein said second clamping member includes a plurality of second extensions spaced from each other with one of said second extensions disposed substantially parallel to said second protrusion of said first arm and an other one of said second extensions disposed substantially parallel to said second protrusion of said second arm when said lever in said set position.

31. A mechanism as set forth in claim 30 wherein said at least one second locking member is further defined as a plurality of second locking members with one of said second locking members mounted to one of said second extensions and said second protrusion of said first arm and an other one of said second locking members mounted to an other one of said second extensions and said second protrusion of said second arm such that movement of said lever in said set position allows said second locking members to extend along said second axis for preventing movement of the column jacket in the tilting direction.

32. A clamping apparatus for an adjustable steering column having a column jacket defining a longitudinal axis with the column jacket moveable in at least one of a telescoping direction and a tilting direction, said apparatus comprising:
   a first clamping member adapted to be disposed along the longitudinal axis about the column jacket;
   a second clamping member disposed adjacent said first clamping member and adapted to be disposed along the longitudinal axis about the column jacket;
   a locking device coupled to at least one of said first and second clamping members and moveable between a locked position for preventing movement of the column jacket in at least one of the telescoping direction and the tilting direction and an unlocked position for allowing movement of the column jacket in at least one of the telescoping direction and the tilting direction;
   said first clamping member includes a first upper portion and a first lower portion spaced from said first upper portion with said first clamping member coupled to said second clamping member and said first clamping member rotatable relative to said second clamping member when said locking device moves between said locked and unlocked positions for selectively allowing and preventing movement of the column jacket in at least one of the telescoping direction and the tilting direction, wherein said second clamping member includes a second upper portion and a second lower portion spaced from said second upper portion with said first upper portion disposed adjacent said second upper portion and said first lower portion disposed adjacent said second lower portion; and
   wherein said first clamping member includes a mid-section between said first upper portion and said first lower portion with said mid-section of said first clamping member coupled to said second clamping member such that movement of said locking device to said locked position allows said first upper portion to rotate toward said second lower portion and said first lower portion to rotate toward said second upper portion for clamping the column jacket therebetween.

33. A clamping apparatus for an adjustable steering column having a column jacket defining longitudinal axis with the column jacket moveable in at least one of a telescoping direction and a tilting direction, said apparatus comprising:
   a first clamping member adapted to be disposed along the longitudinal axis about the column jacket;
   a second clamping member disposed adjacent said first clamping member and adapted to be disposed along the longitudinal axis about the column jacket;
   a locking device coupled to at least one of said first and second clamping members and moveable between a locked position for preventing movement of the column jacket in at least one of the telescoping direction and the tilting direction and an unlocked position for allowing movement of the column jacket in at least one of the telescoping direction and the tilting direction;
   said first clamping member includes a first upper portion and a first lower portion spaced from said first upper portion with said first clamping member coupled to said second clamping member and said first clamping member rotatable relative to said second clamping member when said locking device moves between said locked and unlocked positions for selectively allowing and preventing movement of the column jacket in at least one of the telescoping direction and the tilting direction wherein said second clamping member includes a second upper portion and a second lower portion spaced from said second upper portion with said first upper portion disposed adjacent said second upper portion and said first lower portion disposed adjacent said second lower portion; and wherein said first upper portion of said first clamping member defines a first groove for receiving a portion of said locking device and said second lower portion of said second clamping member defines a second groove for receiving an other portion of said locking device such that movement of said locking device to said locked position allows said portion of said locking device to rotate said first clamping member for preventing movement of the column jacket in the telescoping direction and allows said other portion of said locking device to engage said second clamping member for preventing movement of the column jacket in the tilting direction.

\* \* \* \* \*